(12) United States Patent
Sata et al.

(10) Patent No.: US 8,047,419 B2
(45) Date of Patent: Nov. 1, 2011

(54) METHOD OF MANUFACTURING VEHICLE BODY AND WELDING FACILITY

(75) Inventors: Noritaka Sata, Tokyo (JP); Masami Okada, Tokyo (JP); Toshio Sugahara, Tokyo (JP); Takeshi Arikawa, Tochigi (JP); Hiroshi Nagano, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/853,405

(22) Filed: Aug. 10, 2010

(65) Prior Publication Data

US 2010/0301099 A1  Dec. 2, 2010

Related U.S. Application Data

(62) Division of application No. 12/284,681, filed on Sep. 24, 2008, now abandoned.

(30) Foreign Application Priority Data

Sep. 26, 2007 (JP) ................... 2007-250096

(51) Int. Cl.
*B23K 37/04* (2006.01)
(52) U.S. Cl. ........ 228/43; 228/47.1; 228/49.1; 228/49.4
(58) Field of Classification Search .................. None
See application file for complete search history.

(56) References Cited

U.S. PATENT DOCUMENTS

| | | | |
|---|---|---|---|
| 4,441,645 A * | 4/1984 | Takagishi et al. ............ 228/49.6 |
| 4,678,110 A | 7/1987 | Handa | |
| 4,767,046 A | 8/1988 | Kumagai et al. | |
| 4,779,787 A | 10/1988 | Naruse et al. | |
| 4,981,252 A | 1/1991 | Yazaki et al. | |
| 5,011,068 A * | 4/1991 | Stoutenburg et al. .......... 228/4.1 |
| 5,044,541 A | 9/1991 | Sekine et al. | |
| 5,111,988 A | 5/1992 | Strickland | |
| 5,143,270 A | 9/1992 | Hamada et al. | |
| 5,184,766 A | 2/1993 | Takahashi et al. | |
| 5,191,707 A * | 3/1993 | Sasamoto et al. ................ 29/783 |
| 5,347,700 A * | 9/1994 | Tominaga et al. .............. 29/430 |
| 5,374,799 A * | 12/1994 | Nishimoto et al. ........ 219/117.1 |
| 5,518,166 A * | 5/1996 | Numata et al. ................ 228/182 |
| 5,902,496 A | 5/1999 | Alborante | |
| 6,112,390 A * | 9/2000 | Takeda et al. ................. 29/33 K |
| 6,193,142 B1 | 2/2001 | Segawa et al. | |
| 6,293,454 B1 | 9/2001 | Zhang et al. | |

(Continued)

FOREIGN PATENT DOCUMENTS

JP        62-149572        7/1987

(Continued)

*Primary Examiner* — Kiley Stoner
(74) *Attorney, Agent, or Firm* — Carrier Blackman & Associates, P.C.; William D. Blackman; Joseph P. Carrier

(57) ABSTRACT

A welding facility includes a main welding line for manufacturing an assembly of frame members, and a sub-welding line for manufacturing an assembly of panel members, the sub-welding line merging with the main welding line. The main welding line is comprised of a plurality of welding stages provided with a welding robot, the sub-welding line is provided at the end with a transfer mechanism for transferring the panel member assembly to the desired welding stage, and the merging parts are changeable according to the type of product to be welded. The facility permits a plurality of vehicle bodies having different vehicle types to be manufactured using the same manufacturing line.

8 Claims, 18 Drawing Sheets

U.S. PATENT DOCUMENTS

| | | | |
|---|---|---|---|
| 6,336,582 B1 * | 1/2002 | Kato et al. | 228/102 |
| 6,339,204 B1 * | 1/2002 | Kato et al. | 219/86.7 |
| 6,339,874 B2 | 1/2002 | Segawa et al. | |
| 6,344,629 B1 * | 2/2002 | Kato et al. | 219/148 |
| 6,360,421 B1 * | 3/2002 | Oatridge et al. | 29/469 |
| 6,364,817 B1 | 4/2002 | McNamara et al. | |
| 6,421,893 B1 * | 7/2002 | Katayama et al. | 29/33 K |
| 2002/0056189 A1 * | 5/2002 | Oatridge et al. | 29/771 |
| 2003/0071111 A1 * | 4/2003 | McNamara et al. | 228/212 |
| 2003/0115746 A1 * | 6/2003 | Saito et al. | 29/783 |
| 2003/0189085 A1 * | 10/2003 | Kilibarda et al. | 228/212 |
| 2004/0056497 A1 | 3/2004 | Ghuman et al. | |
| 2005/0044700 A1 | 3/2005 | Ghuman et al. | |
| 2005/0103821 A1 | 5/2005 | Bossert et al. | |
| 2005/0230374 A1 | 10/2005 | Rapp et al. | |
| 2005/0239461 A1 | 10/2005 | Verma et al. | |
| 2005/0269382 A1 | 12/2005 | Caputo et al. | |
| 2008/0061110 A1 * | 3/2008 | Monti et al. | 228/6.1 |
| 2008/0084013 A1 | 4/2008 | Kilibarda | |
| 2008/0105733 A1 | 5/2008 | Monti et al. | |
| 2008/0295335 A1 | 12/2008 | Kilibarda et al. | |

FOREIGN PATENT DOCUMENTS

| | | |
|---|---|---|
| JP | 2001-047328 | 2/2001 |
| JP | 2002-239737 A * | 8/2002 |

* cited by examiner

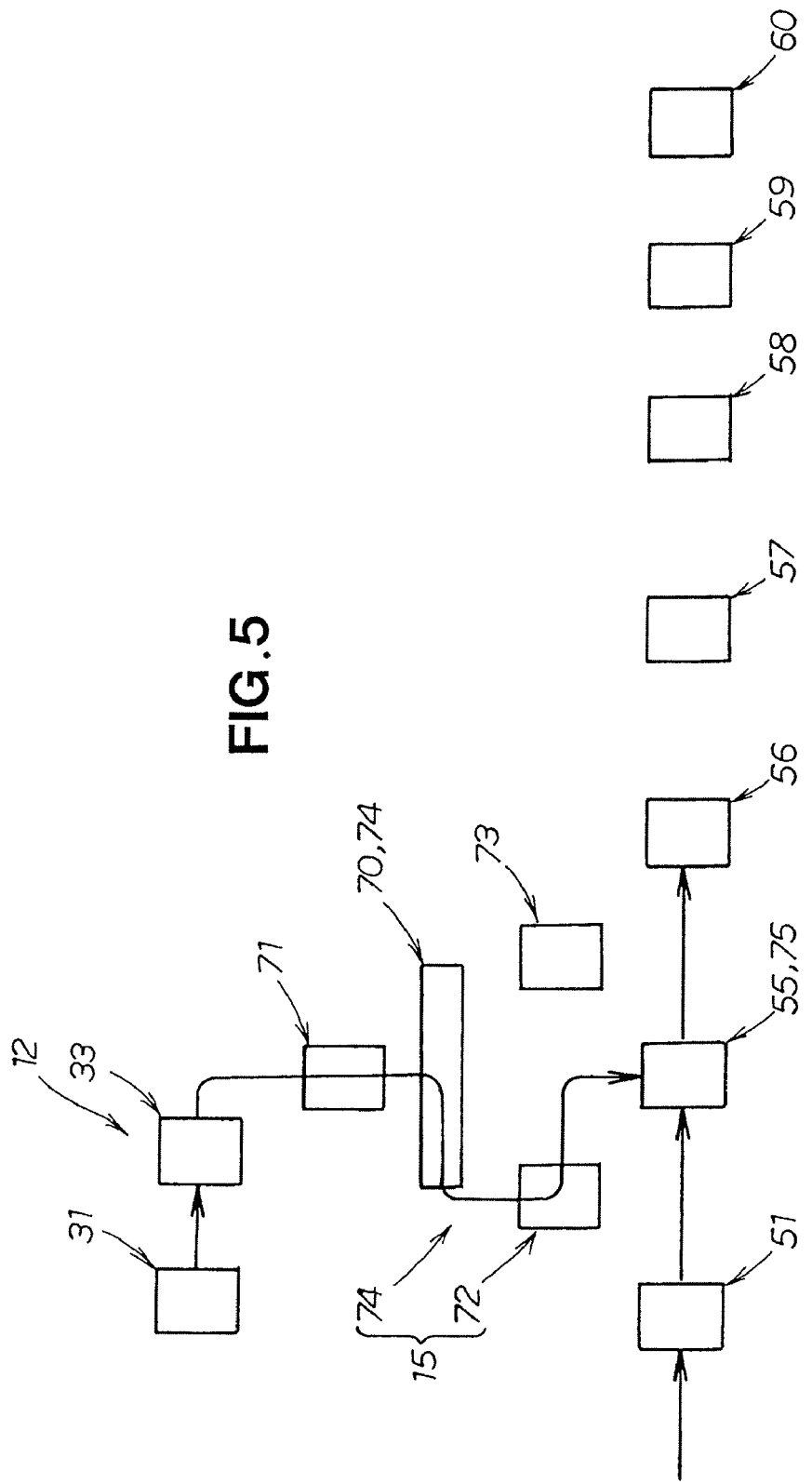

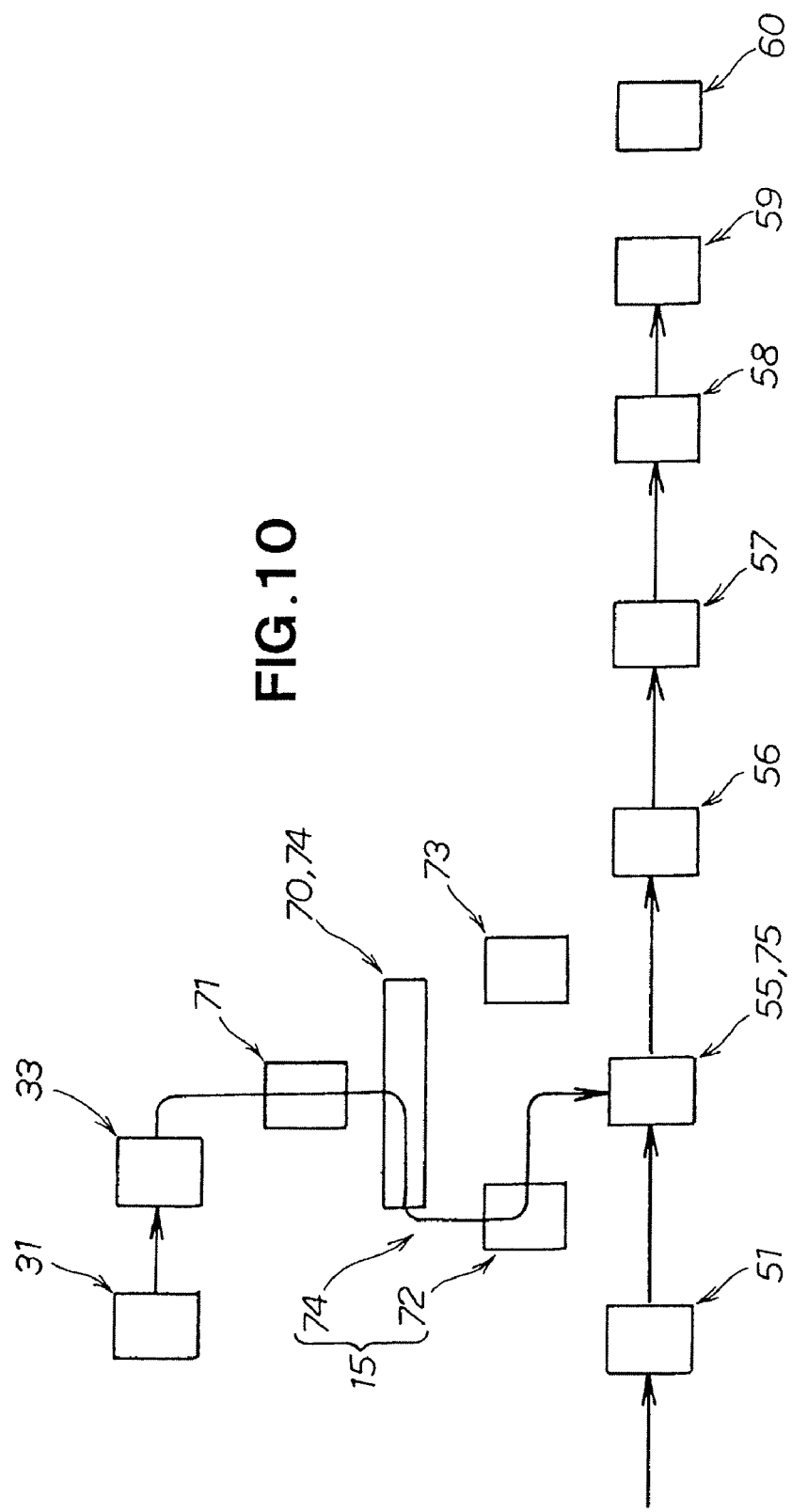

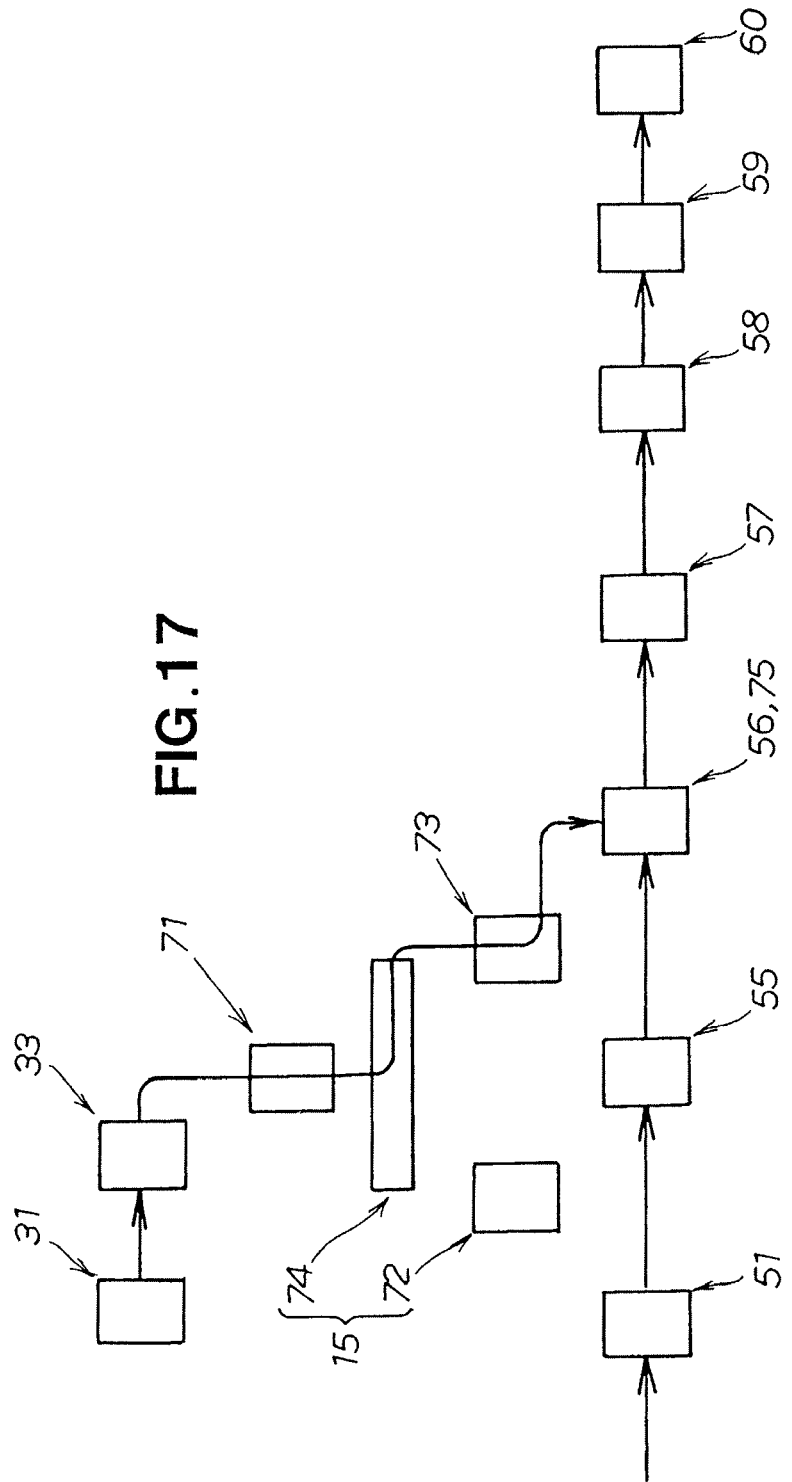

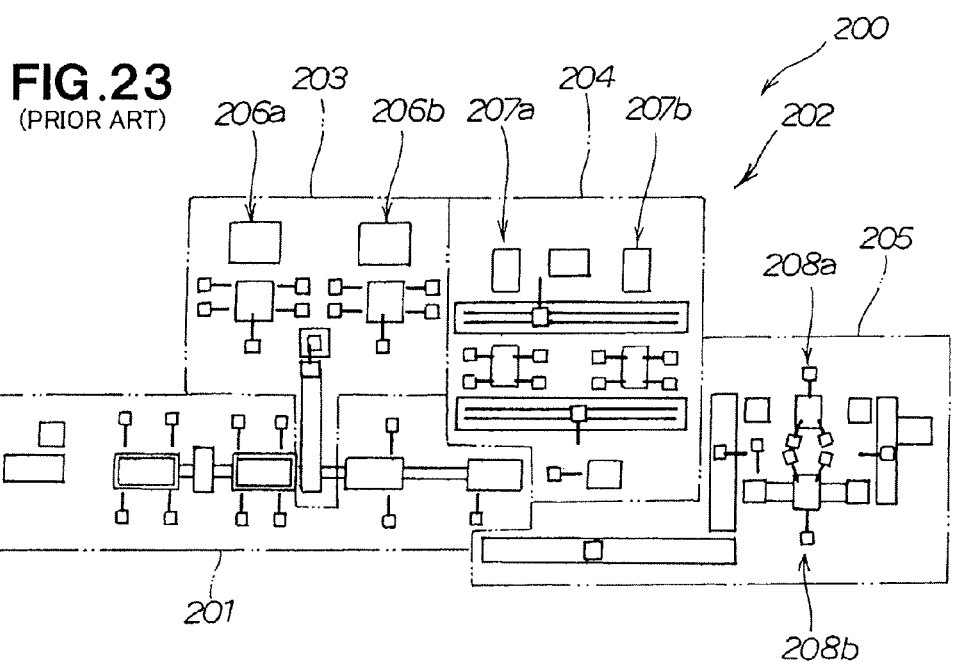

METHOD OF MANUFACTURING VEHICLE BODY AND WELDING FACILITY

CROSS-REFERENCES TO RELATED APPLICATIONS

This application is a divisional of U.S. patent application Ser. No. 12/284,681 filed on Sep. 24, 2008, now abandoned, which claims priority to Japanese Patent Application No. 2007-250096 filed Sep. 26, 2007. The entire disclosures of these applications are incorporated herein by reference.

FIELD OF THE INVENTION

The present invention relates to a welding facility and a method of manufacturing a vehicle body in which a sub-welding line and a main welding line, into which the sub-welding line merges, are provided, and different types of product can be assembled using the flexible welding facility hereof.

BACKGROUND OF THE INVENTION

This type of welding facility is known as disclosed in Japanese Patent Application Laid-Open Publication No. 2001-47328 (JP 2001-47328 A). The welding facility disclosed in JP 2001-47328 A is shown in FIG. 23 hereof.

Referring to FIG. 23, a welding facility 200 is composed of a main welding line 201 and a sub-welding line 202 that merges with the main welding line 201. The sub-welding line 202 is composed of a front floor assembly line 203, a rear floor assembly line 204, and an engine compartment assembly line 205. A workpiece assembled using the assembly lines 203 to 205 is supplied to the main welding line 201, and welded to assemble a vehicle body.

The front floor assembly line 203 constituting the sub-welding line 202 is provided with first and second manufacturing facilities 206a, 206b. The rear floor assembly line 204 is provided with first and second manufacturing facilities 207a, 207b. The engine compartment assembly line 205 is provided with first and second manufacturing facilities 208a, 208b. Different types of products are assembled using the assembly lines 203, 204, 205.

However, a problem is presented when different types of products are welded and assembled in the welding facility disclosed in JP 2001-47328 A, in that a plurality of facilities corresponding to the plurality of product types on each sub-welding line is required, and the surface area needed for the facility is increased. Additionally, since the respective facilities are each dedicated to a specific type of product, few of the facilities can be shared, and difficulties are presented in terms of flexibly and effectively using the facilities.

SUMMARY OF THE INVENTION

An object of the present invention is to allow a welding facility to be used flexibly and effectively, to reduce the surface area needed for the welding facility, and to allow vehicle types whose structures are entirely different from one another to be manufactured together on a single manufacturing line; i.e., to improve the efficiency of mixed model manufacturing.

According to one aspect of the present invention, there is provided a method for welding different types of vehicle body parts and manufacturing a vehicle body using a welding line that is provided with a plurality of welding stages for different welding tasks, wherein the method for manufacturing a vehicle body comprises a step for manufacturing a frame member assembly by welding a different type of frame member on the welding stages, and a step for welding on different welding stages according to the type of vehicle to be manufactured, when the panel member assemblies of the vehicle body are joined with the frame member assemblies.

Since the above manufacturing method includes a step for welding on different welding stages according to the type of vehicle to be manufactured when the panel member assemblies of the vehicle body are joined with the frame member assemblies, a different welding stage is thus used according to the type of vehicle to be manufactured, and different types of vehicle bodies can be manufactured. Accordingly, in a case where a plurality of types of vehicle bodies is used, the shared usability of a welding facility can be increased. Increasing the shareability of the welding facility enables an expensive welding facility to be used flexibly and effectively.

The welding stages that differ according to the vehicle type preferably have at least two change locations. Accordingly, for example, even if different vehicle body types are used, the welding facility can be readily adapted, and can be used more universally.

The panel members are preferably floor panels of the vehicle body or wheel houses. Accordingly, a plurality of types of vehicle bodies having completely different structures can be effectively manufactured in a mixed model flow manufacturing line with a variety of part types.

According to another aspect of the present invention, there is provided a method for manufacturing a vehicle body, in which a sub-welding line for manufacturing an assembly of panel members merges with a main welding line for manufacturing an assembly of frame members; and the panel members are joined with the frame member assembly at a part where merging occurs, comprising a frame welding step for welding a different type of frame member in order to manufacture the frame member assembly on the main welding line; a panel welding step for welding a different type of panel member in order to manufacture the panel member assembly on the sub-welding line; a frame-panel combining step for combining the panel member assembly with the frame member assembly on the main welding line at a location where the frame welding step concludes; and a frame-panel welding step for welding the panel member assembly to the frame member assembly.

The frame member assembly and the panel member assembly are welded on different lines, thereafter integrated, and a vehicle body is manufactured. According to the method of the present aspect, for example, a plurality of stages are provided in the same welding line, whereby the primary welding and the secondary welding can be performed on adjacent welding stages in the same welding line.

If the primary welding and secondary welding can be performed in the same welding line, then even if vehicle bodies having completely different structures are used, it is possible for the vehicle bodies to be manufactured together on a single main welding line; i.e., it is possible for mixed model manufacturing to be carried out. Since mixed model manufacturing can be performed on a plurality of vehicle types using a single welding line, the surface area of the facility can be reduced, and the costs of the facility can be considerably reduced.

Furthermore, the fact that the primary welding and the secondary welding can be performed together in each of the welding lines makes it possible for a flexible approach to be adopted by allocating members having different numbers of welding points to different welding stages, even when the vehicle body structures are different and the number of welding points is different.

For example, if the primary welding and the secondary welding are allocated to different welding stages in the panel welding line, and allocated to different welding stages when the frame and panel are integrated, no concerns will be presented that the manufacturing capability of the sub-welding line will be compromised when the type of vehicle body is changed. Accordingly, a plurality of types of vehicle bodies having completely different structures can be efficiently manufactured in a mixed model manufacturing line with a variety of part types.

According to yet another aspect of the present invention, there is provided a welding facility comprising a main welding line for manufacturing an assembly of frame members; and a sub-welding line for manufacturing an assembly of panel members, the sub-welding line merging with the main welding line; wherein the main welding line is composed of a plurality of welding stages provided with a welding robot, the sub-welding line is provided at the end with a transfer mechanism for transferring the panel member assembly to the desired welding stage, and the merging parts can change according to the type of product to be welded.

When a plurality of types of products is present in a variety of combinations and manufactured using a single main welding line, the number of steps in the welding tasks differs according to the type of product; therefore, the merging parts are usually different.

According to the present invention, a transfer mechanism that allows the merging part to be changed is provided to address this issue; therefore, individual transfer mechanisms do not have to be provided for each product. Specifically, the transfer mechanism can be shared. The ability for the transfer mechanism to be shared makes it possible to reduce the surface area required for the facility, and reduce the facility costs.

Providing a transfer mechanism also makes it possible to adjust any unbalance in load between the welding lines occurring when the type of vehicle body to be welded is changed, and line balancing can be performed in a uniform manner.

In addition to having a shared transfer mechanism, it is also possible to provide a structure that allows a plurality of types of products to be welded on jigs and facilities disposed on each of the welding lines, whereby the area required for the welding facility can be further reduced.

The first main welding line transfer mechanism preferably comprises a rail established parallel to the main welding line, a truck that moves along the rail, and a transport robot provided on the truck. The rail and the truck thus allow the transport robot to be moveably provided parallel to the main welding line; therefore, instances such as when the location of the merging part needs to be changed due to a change in the type of vehicle body, or when the number of locations of the merging part is increased as a result of an increase in the number of product types or another reason can be addressed merely by changing the length of the rail or making an otherwise minor reconfiguration. The facility costs can accordingly be minimized even when mixed model manufacturing using a variety of part types is performed.

The welding facility is preferably provided with at least two or more sub-welding lines to which a transfer mechanism for transferring a workpiece to a desired welding stage has been affixed, and which merge with the main welding line. Accordingly, the surface area needed for the welding facility can be reduced, and the facility costs can be reduced.

BRIEF DESCRIPTION OF THE DRAWINGS

Certain preferred embodiments of the present invention will be described in detail below, by way of example only, with reference to the accompanying drawings, in which:

FIG. 5 is a view showing flow of a workpiece according to a first vehicle type in a welding line according to the present embodiment;

FIG. 10 is a view showing the flow of a workpiece according to the manufacture of a second vehicle type in a welding line of the present embodiment;

FIG. 17 is a view showing the flow of a workpiece according to the manufacture of a third vehicle type in a welding line of the present embodiment;

FIG. 23 is a schematic view showing a welding line composed of a conventional main welding line and a sub-welding line.

DETAILED DESCRIPTION OF THE PREFERRED EMBODIMENTS

Figure 1:
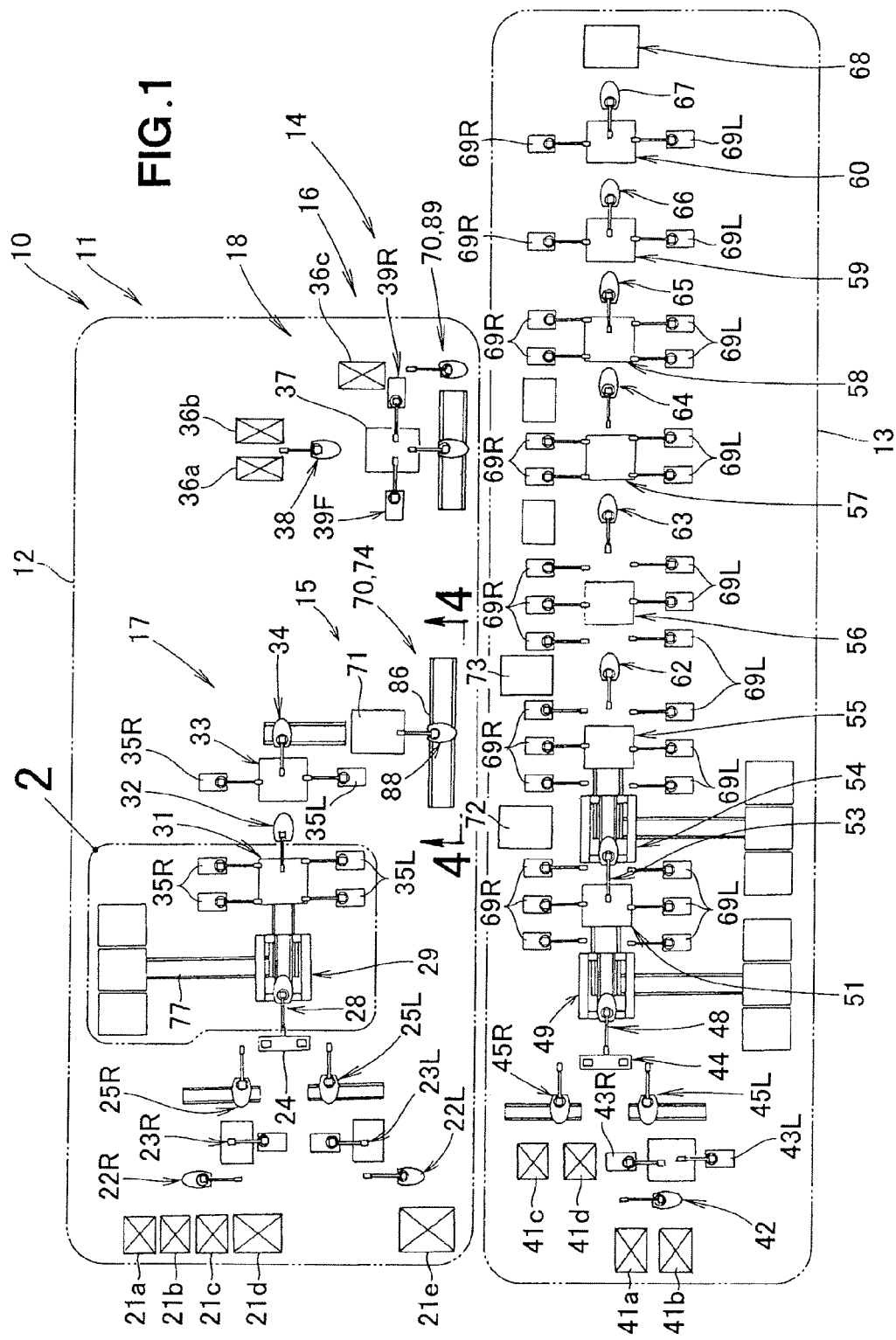
FIG. 1 is a schematic view of a welding line provided in a welding facility according to the present invention.

Reference is now made to FIG. 1 showing the layout of a welding line 11 for assembling a rear floor part of a four-wheeled vehicle.

The welding line 11, which is provided in a welding facility 10, has a sub-welding line 12 for welding together panel members that constitute a rear floor, a main welding line 13 for welding and completing a rear floor part, and a panel supply part 14 for causing the sub-welding line 12 to merge with the main welding line 13 and supplying a panel member to a frame member. In the present embodiment, the panel supply part 14 has a first panel supply part 15 and a second panel supply part 16.

The sub-welding line 12 is provided with a first sub-welding line 17 and a second sub-welding line 18. The first sub-welding line 17 is connected to the main welding line 13 via the first panel supply part 15. The second sub-welding line 18 is connected to the main welding line 13 via the second panel supply part 16.

The first sub-welding line 17 is provided with a plurality of part-accommodating pallets 21a to 21e; left and right first retrieving robots 22L, 22R; left and right welding robots 23L, 23R; left and right first delivery robots 25L, 25R; a first transfer robot 28; a first parts transfer mechanism 29; a first welding stage 31; a second transfer robot 32; a second welding stage 33; a third transfer robot 34; and a plurality of welding robots 35L, 35R respectively disposed on the left and right.

Each of the plurality of part placement pallets 21a to 21e holds a panel member.

The first retrieving robots 22L, 22R retrieve necessary parts from each of the plurality of part placement pallets 21a to 21e.

The welding robots 23L, 23R weld a nut or the like on the retrieved parts as needed.

The first delivery robots 25L, 25R take the parts from the first retrieving robots 22L, 22R and deliver them to a first temporary placement part 24.

The first transfer robot 28 transfers parts from the first temporary placement part 24 to a subsequent stage.

The first parts transfer mechanism 29 has the first transfer robot 28.

The first welding stage 31 is located next to the first parts transfer mechanism 29, and is where the transferred parts are subjected to a primary welding (also referred to as "temporary welding" hereinbelow).

The second transfer robot 32 is disposed rearward of the first welding stage 31.

A secondary welding ("additional welding" below) is performed rearward of the second transfer robot 32, on the second welding stage 33.

The third transfer robot 34 transfers an assembled panel member assembly from the second welding stage 33 to the first panel supply part 15.

The welding robots 35L, 35R are disposed on the left and right of the first and second welding stages 31, 33.

The second sub-welding line 18 is provided with a plurality of part-accommodating pallets 36a to 36c for holding parts, a second retrieving robot 38 for retrieving necessary parts from the part-accommodating pallets 36a to 36c to a retrieval stage 37, and welding robots 39F, 39R disposed laterally with respect to the retrieval stage 37, the welding robots 39F, 39R used for welding a nut or the like on the retrieved parts as needed.

The main welding line 13 is provided with accommodating pallets 41a to 41d for holding frame members; a third retrieving robot 42 for retrieving the required frame members from the accommodating pallets 41a, 41b, which are one portion of the accommodating pallets 41a to 41d; welding robots 43L, 43R for welding a nut or the like on the retrieved parts as needed; delivery robots 45L, 45R for taking parts from the third retrieving robot 42, and for taking parts from the accommodating pallets 41c, 41d and delivering them to a second temporary placement part 44; a second parts transfer mechanism 49 which has a third transfer robot 48 for transferring parts from the second temporary placement part 48 to the next stage; a third welding stage 51 adjacent to the second parts transfer mechanism 49, the third welding stage 51 being where the primary welding is performed on the transferred frame members; a third component transfer mechanism 54 provided on the rear side of the third welding stage 51 which has a fourth transfer robot 53; a fourth welding stage 55 provided rearward of the third parts transfer mechanism 54; fifth to ninth welding stages 56 to 60 provided rearward of the fourth welding stage 55 in the stated order; fifth to tenth transfer robots 62 to 67 disposed respectively between the fourth to ninth welding stages 55 to 60; and a plurality of welding robots 69L, 69R provided on the left and right sides of the third to ninth welding stages 51, 55 to 60.

Specifically, the main welding line 13 is composed of a plurality of welding stages provided with left and right welding robots 69L, 69R. An end stage 68 is provided rearward of the ninth welding stage 60, and is where a completed rear floor arrives via the tenth transfer robot 67.

The first panel supply part 15 is composed of a panel assembly retrieval stage 71 for retrieving a panel member assembly in which panel members have been assembled on the first sub-welding line 17; first front and rear receiving stages 72, 73 disposed laterally with respect to the main welding line 13; and a first main welding line transfer mechanism 74 for transferring a panel member assembly to the first front receiving stage 72 or the first rear receiving stage 73.

A panel parts assembly transferred to the first front receiving stage 72 can be transferred to the fourth welding stage 55 of the main welding line using the fourth transfer robot 53.

A panel parts assembly transferred to the first rear receiving stage 73 can be transferred to the fifth welding stage 56 of the main welding line using the fifth transfer robot 62.

Specifically, the first main welding line transfer mechanism 74, which is a transfer mechanism 70 for transferring the panel member assembly to a desired welding stage, is disposed at the end of the sub-welding line 12. The first main welding line transfer mechanism 74 shall be described further below.

Figure 2:
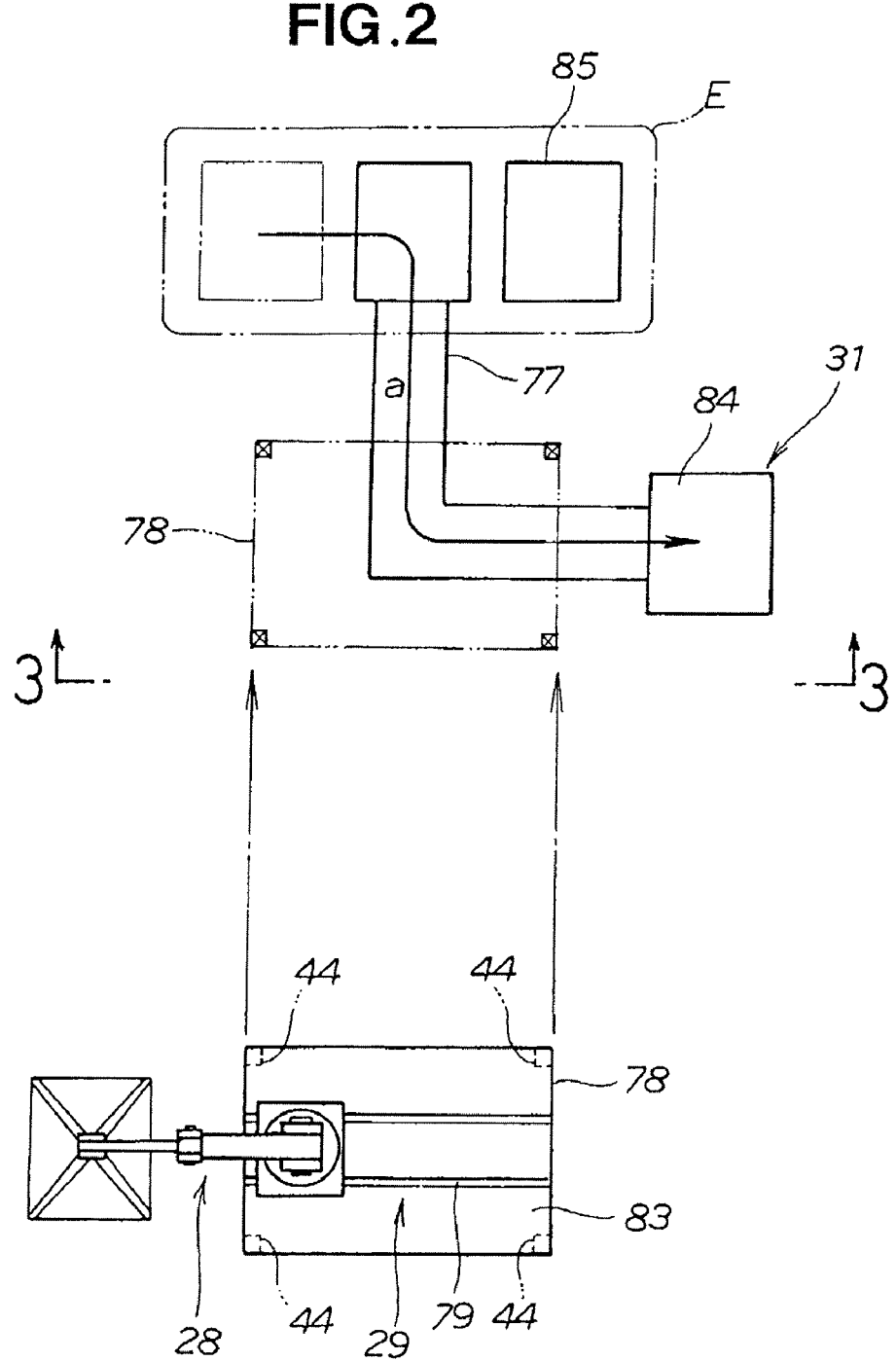
FIG. 2 is an enlarged view of part 2 of FIG. 1.
Figure 3:
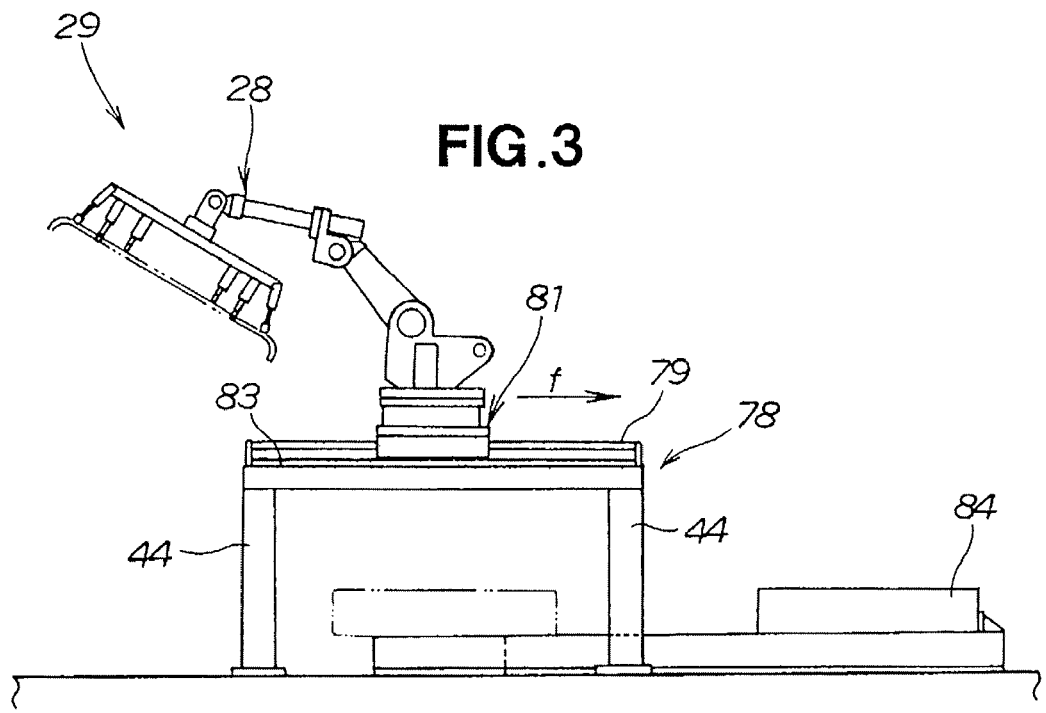
FIG. 3 is a view as seen in the direction of arrow 3-3 of FIG. 2.

As shown in FIGS. 2 and 3, a jig transport conveyor 77 is established in a substantially L-shaped form from a jig storage area E to the first welding stage 31. A raised frame 78 is provided so as to span the jig transport conveyor 77. The raised frame 78 comprises the first parts transfer mechanism 29. An upper rail 79 is established on the raised frame 78, and a first transfer robot 28 is moveably provided on the upper rail 79.

The first parts transfer mechanism 29 comprises the first transfer robot 28, which is moveably attached via an upper truck 81 and the upper rail 79 disposed on the raised frame 78.

The raised frame 78 is composed of four pillar parts 44 extending in the vertical direction and a floor part 83 attached on an upper end part of the pillar parts 44.

A first jig truck 84 and a second jig truck 85 are moveably provided between the jig storage area E and the first welding stage 31. In FIG. 2, the first jig truck 84 moves on the jig transport conveyor 77 to the first welding stage 31 in the direction of arrow a in the drawing.

The first transfer robot 28 is provided on top of the raised frame 78, and accordingly grasps the parts from the first temporary placement part 24 (FIG. 1), moves along the upper rail 79, and transfers the parts to a predetermined location on the first jig provided on the first jig truck 84. Specifically, the action of the first jig truck 84 is performed simultaneously with the action of the first transfer robot 28; therefore, the manufacturing ability of the facility is greatly increased.

The second parts transfer mechanism 49 and the third parts transfer mechanism 54 perform the same function as the first parts transfer mechanism 29; therefore, an associated description is not given.

Figure 4:
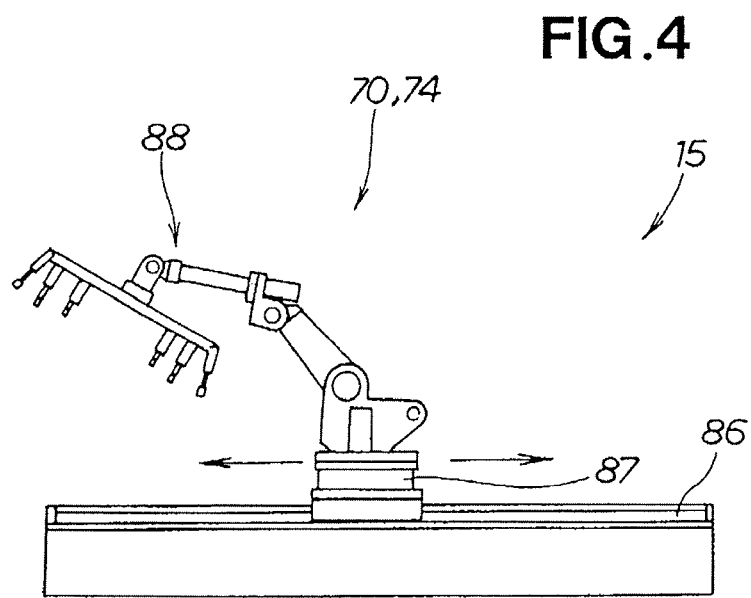
FIG. 4 is a view as seen in the direction of arrow 4-4 of FIG. 1.

The first main welding line transfer mechanism 74 provided on the first panel supply part 15 shown in FIG. 4 takes the panel parts assembly on the panel assembly retrieval stage 71 shown in FIG. 1, and transfers the assembly to the first front receiving stage 72 and the rear receiving stage 73, which are disposed laterally with respect to the main welding line 13.

The first main welding line transfer mechanism 74 is composed of a rail 86 established parallel to the main welding line 13, a truck 87 that moves along the rail 86, and a transport robot 88 provided on the truck 87.

The rail 86 and the truck 87 allow the transport robot 88 to be moveably provided parallel to the main welding line 13; therefore, in instances such as when a change in the type of product causes the location of the panel supply part 14 to be changed, or when an increase in the number of types of product causes the number of locations of the panel assembly part 14 to increase, it is possible to respond merely by changing the length of the rail 86 or by making an otherwise minor reconfiguration. The facility costs incurred when a change is made to the model of the product can accordingly be reduced.

The second main welding line 89 shown in FIG. 1 has the same basic configuration as the first main welding line parts transfer mechanism 74, with the sole exception being that the parts that are transferred are different. An associated description has accordingly not been provided.

A step for welding a rear floor part of the first vehicle type will be described below with reference to FIGS. 5 to 9.

FIG. 5 shows the flow of a workpiece according to a first vehicle type in a welding line of the present embodiment, and a description is provided with reference to FIG. 1.

A panel member according to the first vehicle type, which is the workpiece, passes through the first welding stage 31 and the second welding stage 33 disposed on the sub-welding line 12; and arrives at the first front receiving stage 72 via the first main welding line transfer mechanism 74.

A frame member is assembled on the third welding stage 51. A panel member assembly that has been assembled from panel members according to the first vehicle type, which have been transferred from the first main welding line transfer mechanism 74, is combined with a frame member on the fourth welding stage 55 using a third parts transfer mechanism 54. Specifically, the fourth welding stage 55 is a merging part 75 in the case of the first vehicle type.

A vehicle body transferred from the fourth welding stage 55 to the fifth welding stage 56 is subjected to additional welding on the fifth welding stage 56. Each step is described in detail in order below.

Figure 6A:
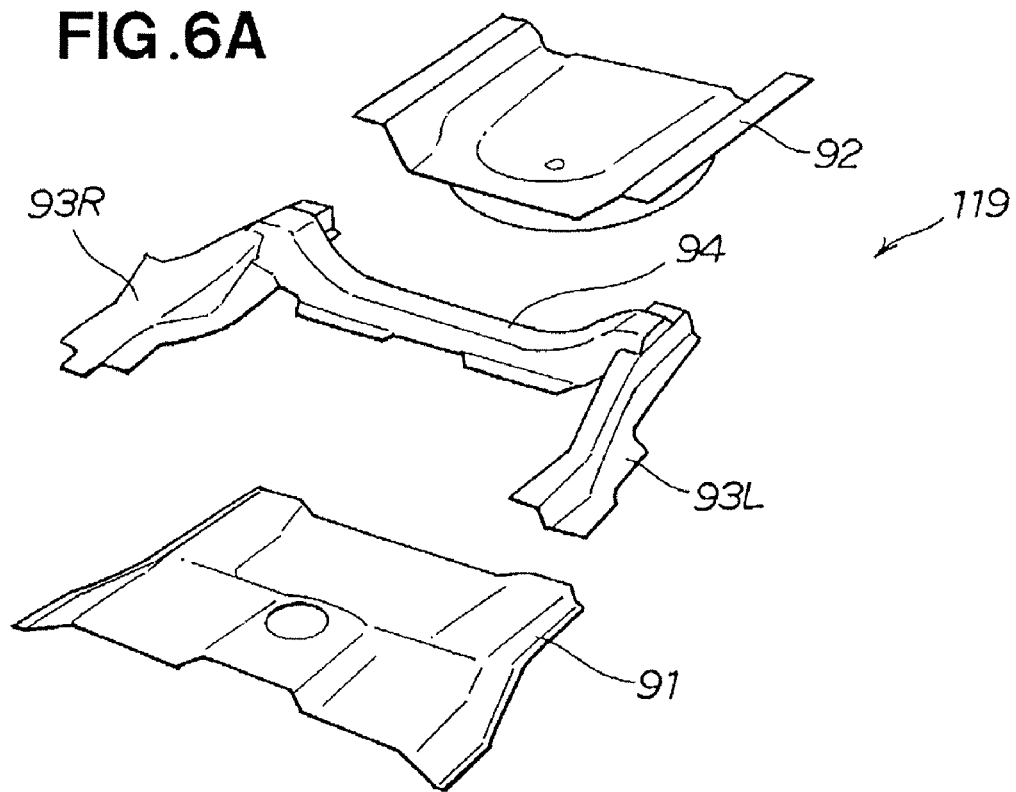
FIGS. 6A and 6B show a panel welding step for welding a plurality of types of panel members according to the first vehicle type using a sub-welding line.
Figure 6B:
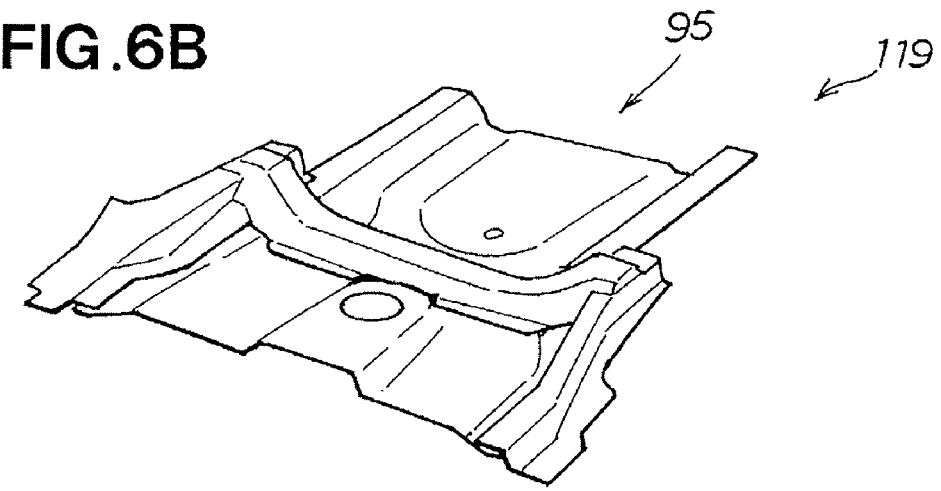

FIGS. 6A and 6B show a panel welding step for welding a plurality of types of panel members according to the first vehicle type on the sub-welding line. The panel welding step is described with reference to FIG. 5.

The sub-welding line 12 has a panel welding step for welding different types of panel members. A specific description is given below.

On the first welding stage 31, a first rear floor rear 92 is positioned rearward of a first rear floor front 91, left and right first sub-rails 93L, 93R are positioned on an upper surface of the first rear floor front 91, and a first cross sub-rail 94 is positioned so as to span between the left and right first sub-rails 93L, 93R. The parts are temporarily welded together and integrated, according to FIG. 6A.

A member obtained by integrating the first rear floor front 91, the first rear floor rear 92, the left and right first sub-rails 93L, 93R, and the first cross sub-rail 94 is referred to below as a first panel member assembly 95.

The first panel member assembly 95 is transferred from the first welding stage 31 to the second welding stage 33, and the first panel member assembly 95 is subjected to additional welding on the second welding stage 33, according to FIG. 6B.

Figure 7A:
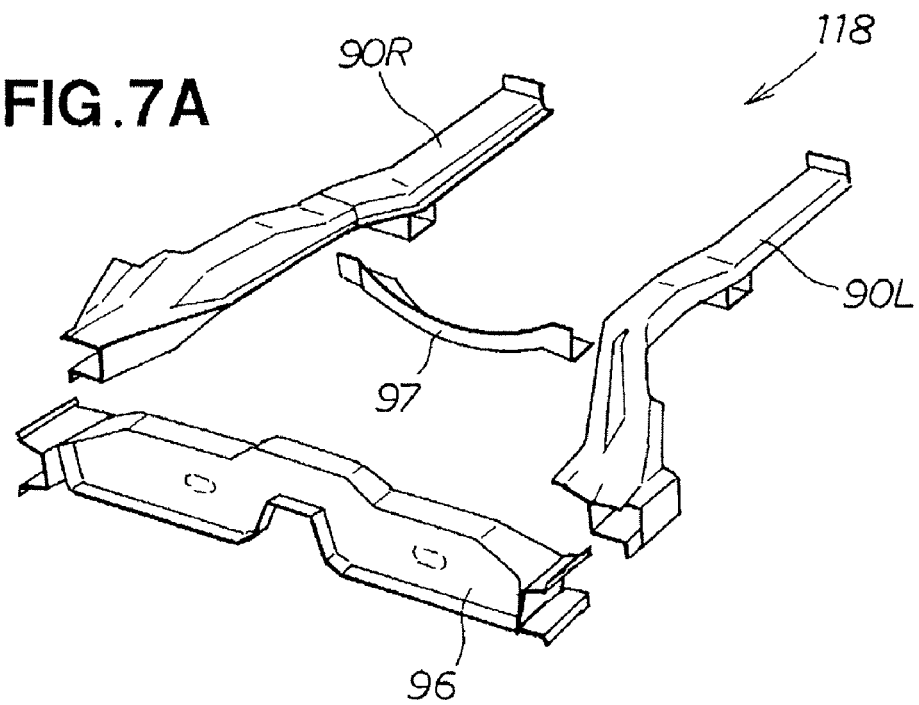
FIGS. 7A and 7B show a frame welding step for welding a plurality of types of frame members according to the first vehicle type using a main welding line.
Figure 7B:
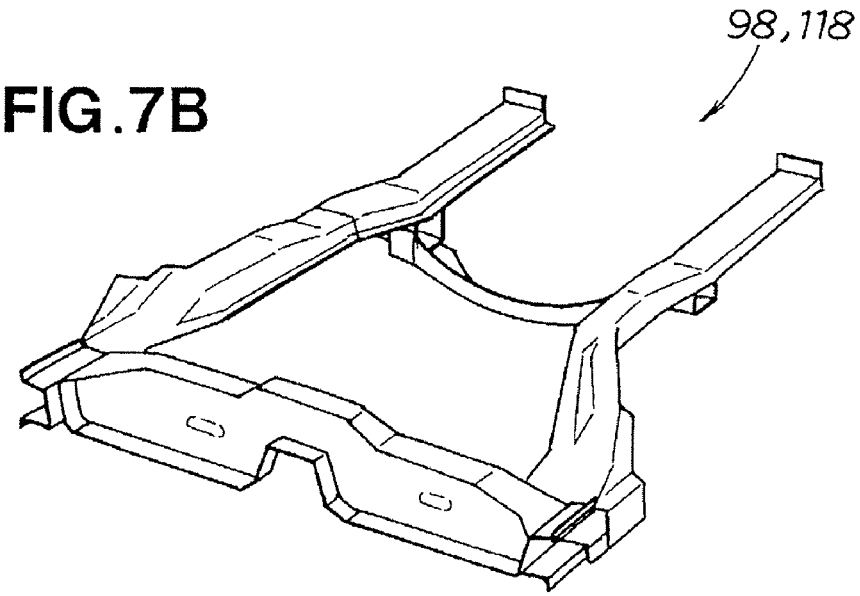

FIGS. 7A and 7B show a frame welding step for welding different types of frame members according to the first vehicle type on the main welding line, and a description is provided with reference to FIG. 5.

The main welding line 13 has a frame welding step for welding a plurality of types of frame members.

On the third welding stage 51, first left and right rails 90L, 90R are positioned on a predetermined jig, a first rear cross member 96 is positioned between the front end parts of the first left and right rails 90L, 90R, and a first sub-cross member 97 is positioned between center parts of the first left and right rails 90L, 90R. The parts are temporarily welded together and integrated, according to FIG. 7A.

A member obtained by integrating the first left and right rails 90L, 90R, the first rear cross member 96, and the first sub-cross member 97 is referred to below as a first frame member assembly 98.

A temporarily welded first frame member assembly 98 is shown in FIG. 7B.

Figure 8:
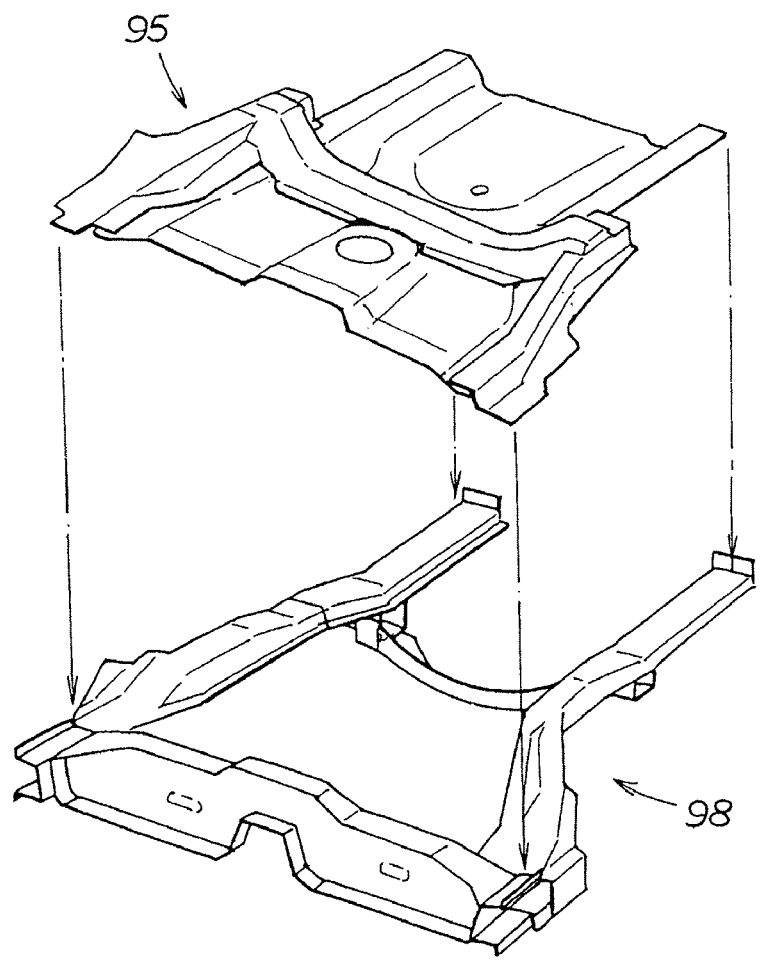
FIG. 8 shows a frame-panel combining step for combining a panel member and a frame member according to the first vehicle type.

FIG. 8 shows a frame-panel combining step for combining a panel member according to the first vehicle type. The step is described with reference to FIG. 5.

The main welding line 13 has a frame-panel combining step for combining the first panel member assembly 95, which is the panel member, with the first frame member assembly 98, which is the frame member.

Specifically, first, the first frame member assembly 98 is transferred from the third welding stage 51 to the fourth welding stage 55, and, subsequently, the first panel member assembly 95 is transferred from the second welding stage 33 to the fourth welding stage 55 via the first panel supply part 15. The first panel member assembly 95 used as a panel member is combined with the first frame member assembly 98 used as a frame member, and temporarily welded in the fourth welding stage 55. The combined member is referred to below as a first frame panel assembly 99.

Figure 9:
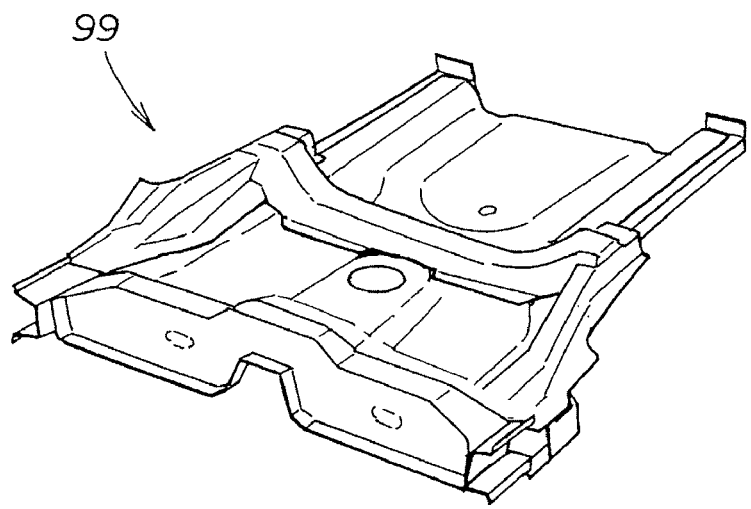
FIG. 9 shows a frame-panel welding step for welding a panel member on a frame member according to the first vehicle type.

FIG. 9 shows a frame-panel welding step for welding a panel member to a frame member. A description is provided with reference to FIG. 5.

The main welding line 13 has a frame-panel welding step for welding the first panel member assembly 95 to the first frame member assembly 98.

The combined first frame panel assembly 99 is subjected to additional welding, and the assembling of a rear floor part according to the first vehicle type is completed in the fifth welding stage 56. The first frame panel assembly 99 having been completely assembled passes through the fifth welding stage 56 to the ninth welding stage 60 in the stated order, and reaches an end stage 68.

Specifically, the method of manufacturing a vehicle body according to the first vehicle type comprises a frame welding step for welding a plurality of types of frame members according to the first vehicle type on the main welding line 13, a panel welding step for welding a plurality of types of panel members according to the first vehicle type on the sub-welding line 12, a frame-panel combining step for combining a panel member with a frame member on the main welding line 13 at a location where the frame welding step ends, and a frame-panel welding step for welding a panel member to a frame member.

A step for welding a rear floor part of a second vehicle type shall now be described with reference to FIGS. 10 to 16.

FIG. 10 shows the flow of a workpiece according to the manufacture of a second vehicle type in a welding line, and a description is provided with reference to FIG. 1.

A panel member assembly according to the second vehicle type, which is the workpiece, passes through the first welding stage 31 and the second welding stage 33 disposed on the sub-welding line 12; and arrives at the first front receiving stage 72 via the first main welding line transfer mechanism 74.

A frame member is assembled on the third welding stage 51, and a panel member assembly according to the second vehicle type that is transferred via the first main welding line transfer mechanism 74 is integrated with a frame member using the third parts transfer mechanism 54 on the fourth welding stage 55. Specifically, the fourth welding stage 55 is a merging part 75 in the case of a second vehicle type.

A vehicle body transferred from the fourth welding stage 55 to the fifth welding stage 56 is subjected to additional welding on the fifth welding stage 56, and other members are attached in the sixth to eighth welding stages 57 to 59. Each step is described in order below.

Figure 11A:
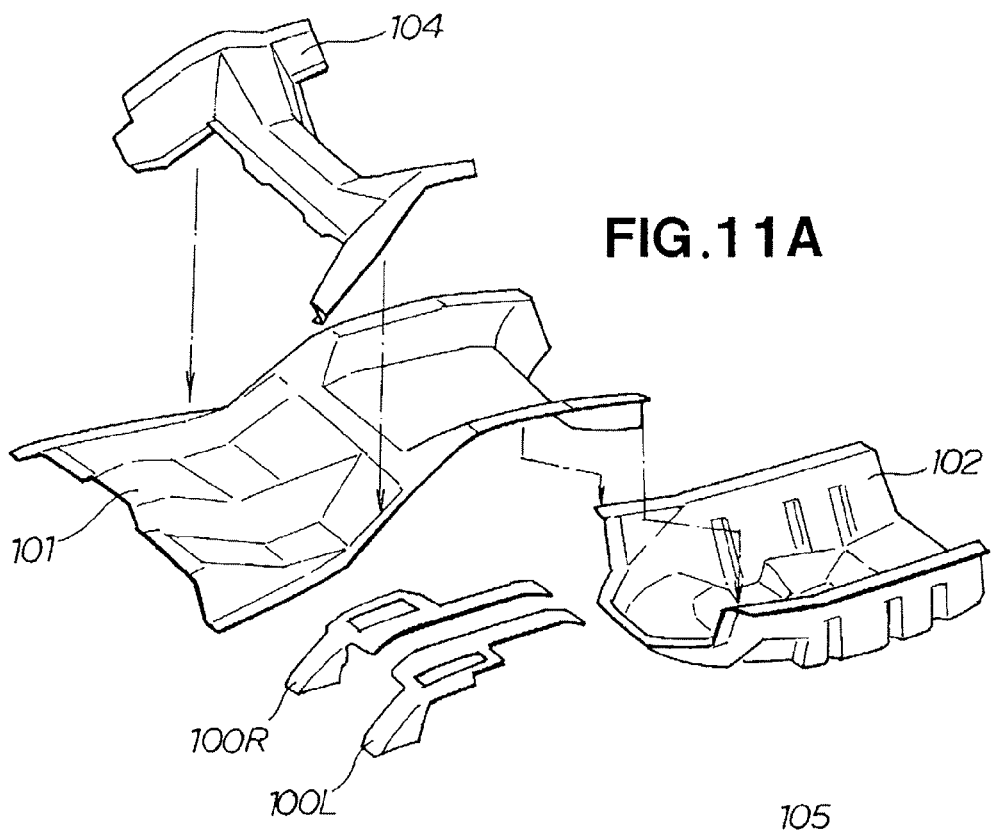
FIGS. 11A and 11B show a panel welding step for welding several types of panel members according to the second vehicle type using a sub-welding line.
Figure 11B:
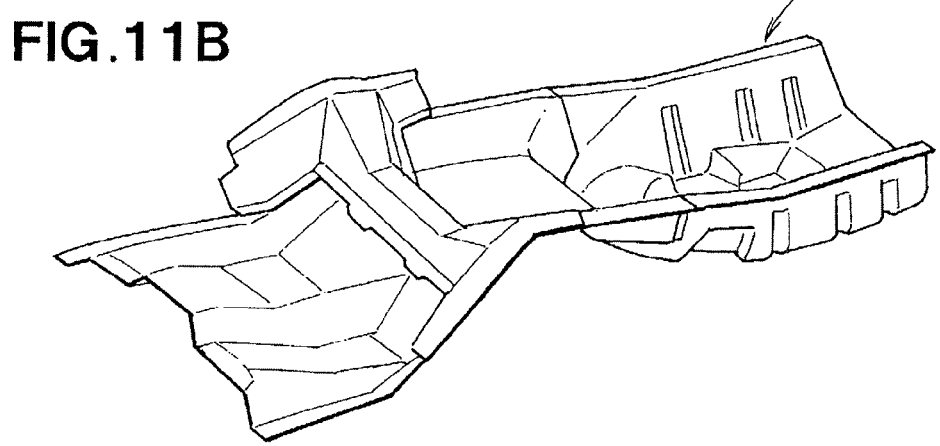

FIGS. 11A and 11B show a panel welding step for welding a plurality of types of panel members according to the second vehicle type on the sub-welding line. The panel welding step is described with reference to FIG. 10.

A predetermined jig truck is caused to move on a first welding stage 31. On the first welding stage 31, left and right reinforcing members 100L, 100R are positioned, a second rear floor rear 102 is positioned, a second rear floor front 101 is positioned on a front end part of the second rear floor rear 102 above the left and right reinforcing materials 100L, 100R, and a second cross sub-rail 104 is positioned on an upper surface of the second rear floor front 101. Each part above is temporarily welded together and integrated, according to FIG. 11A.

A member obtained by integrating the left and right reinforcing members 100L, 100R, the second rear front 101, the second rear floor rear 102, and the second cross sub-rail 104 is referred to as a panel member assembly 105 below.

The second panel member assembly 105 is transferred from the first welding stage 31 to the second welding stage 33, and the second panel member assembly 105 is subjected to additional welding in the second welding stage 33, according to FIG. 11B.

Figure 12A:
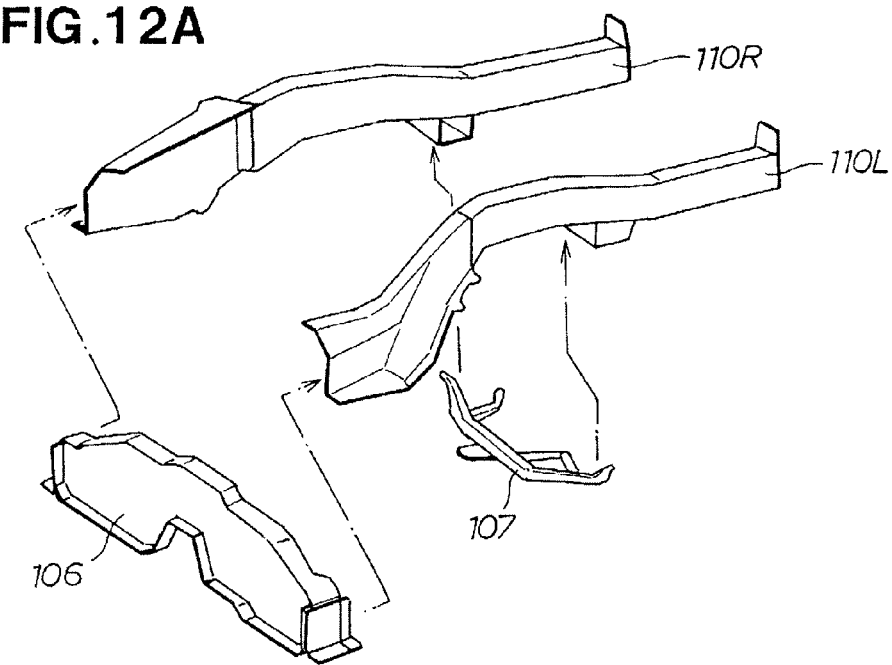
FIG. 12 shows a frame welding step for welding a plurality of types of frame members according to the second vehicle type using a main welding line.
Figure 12B:
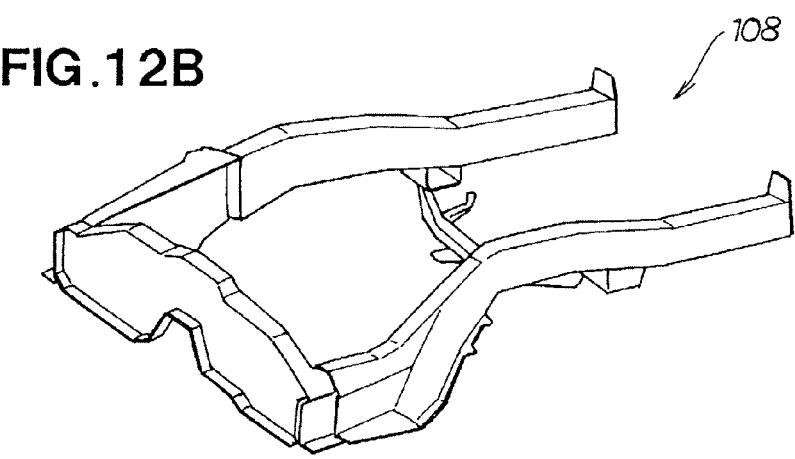

FIGS. 12A and 12B show a frame welding step for welding a plurality of types of frame members according to the second vehicle type on the main welding line. The step is described with reference to FIG. 10.

The main welding line 13 has a frame welding step for welding a plurality of types of frame members.

A predetermined jig is caused to move on the third welding stage 51, second left and right rails 110L, 110R are positioned on the jig, a second rear cross member 106 is positioned between the second left and right rails 110L, 110R, and a second sub-cross member 107 is positioned. Each part above is temporarily welded together and integrated, according to FIG. 12A.

A member obtained by integrating the second rear cross member 106, the second sub-cross member 107, and the second left and right rails 110L, 110R is referred to as a second frame member assembly 108 below.

The temporarily welded second frame panel assembly 108 is shown in FIG. 12B.

Figure 13:
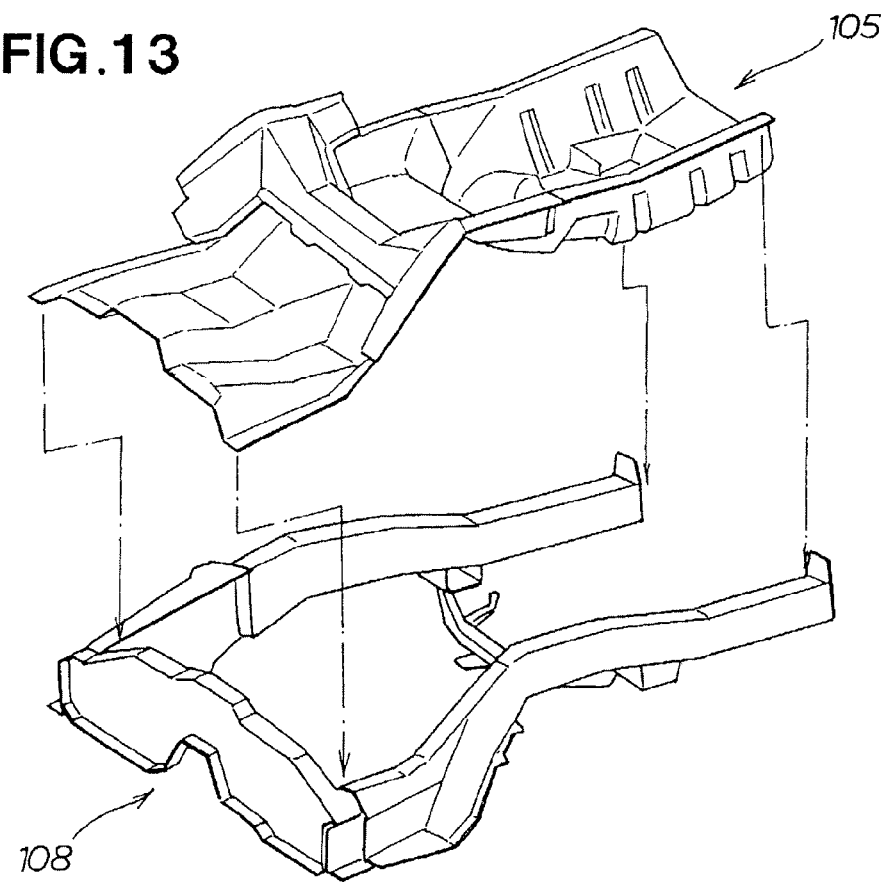
FIG. 13 shows a frame-panel combining step for combining a panel member and a frame member according to the second vehicle type.

FIG. 13 shows a frame-panel combining step for combining a panel member according to the second vehicle type. The step is described with reference to FIG. 10.

The main welding line 13 has a frame-panel combining step for combining the second panel member assembly 105, which is a panel member, and the second frame member assembly 108, which is a frame member.

The second frame member assembly 108 is transferred from the third welding stage 51 to the fourth welding stage 55, and the second panel member assembly 105 is transferred from the second welding stage 33 to the fourth welding stage 55 via the first panel supply part 15. The second panel member assembly 105 that is a panel member is integrated with and welded to the second frame member assembly 108 that is a frame member. The combined member is referred to as a second frame panel assembly 109 below.

Figure 14:
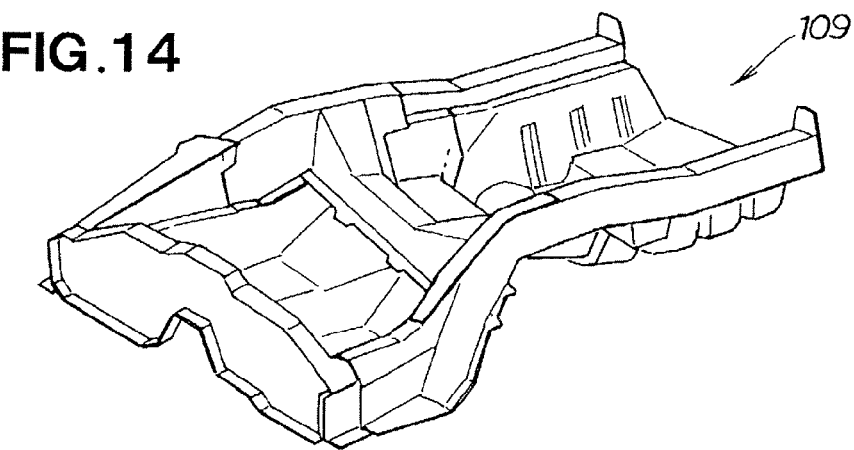
FIG. 14 shows a frame-panel welding step for welding a panel member on a frame member according to the second vehicle type.

FIG. 14 shows a frame-panel welding step for welding a panel member on a frame member according to the second vehicle type, and a description is provided with reference to FIG. 10.

The main welding line 13 has a frame-panel welding step for welding the second panel member assembly 105 to the second frame member assembly 108.

On the fifth welding stage 56, the second frame member assembly 108 and the second panel member assembly 105 are integrated, and the temporarily welded second frame panel assembly 109 is subjected to additional welding.

Figure 15A:
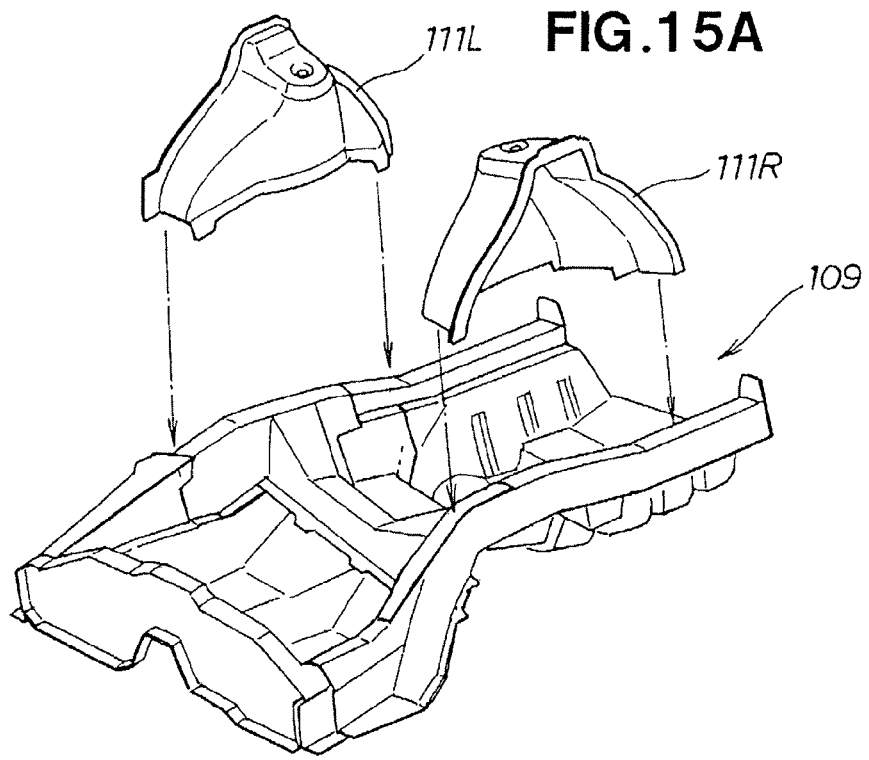
FIGS. 15A and 15B show a step for attaching left and right wheel house members on a second frame panel assembly according to the second vehicle type.
Figure 15B:
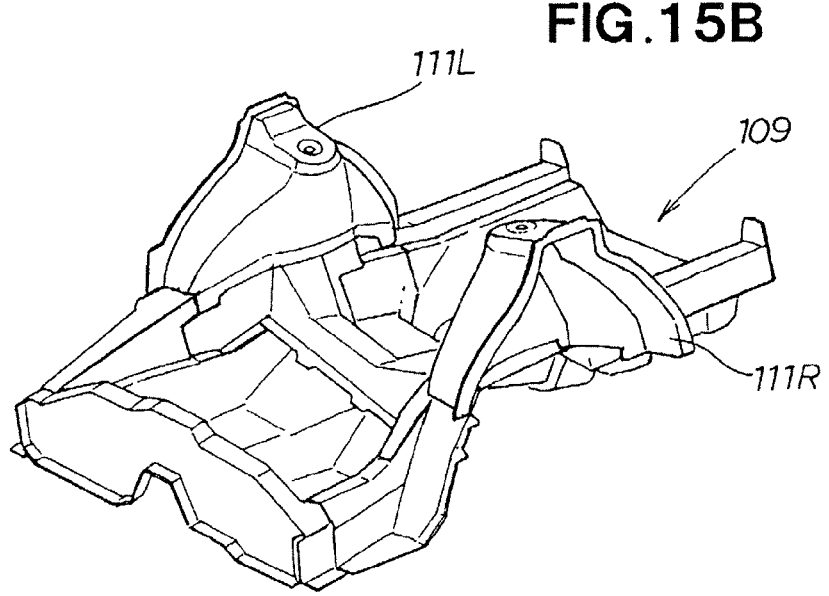

FIGS. 15A and 15B show a step for attaching left and right wheel house members to a second frame panel assembly according to the second vehicle type, and a description is provided with reference to FIG. 10.

On the sixth welding stage 57, left and right wheel house members 111L, 111R are positioned in, and temporarily welded at, a predetermined location on the left and right end parts of the second panel assembly 109, according to FIG. 15A.

FIG. 15B shows a state in which the left and right wheel house members 111L, 111R are attached to the second frame panel assembly 109.

Figure 16A:
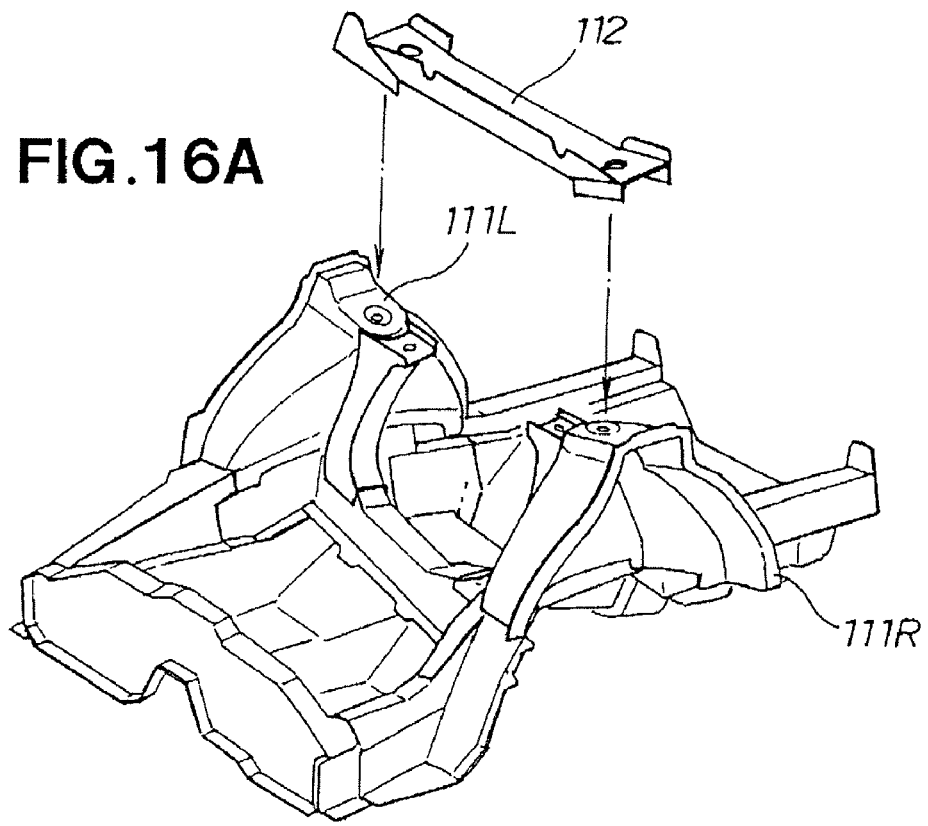
FIGS. 16A and 16B show a step for attaching a crossbeam member between the left and right wheel house members.
Figure 16B:
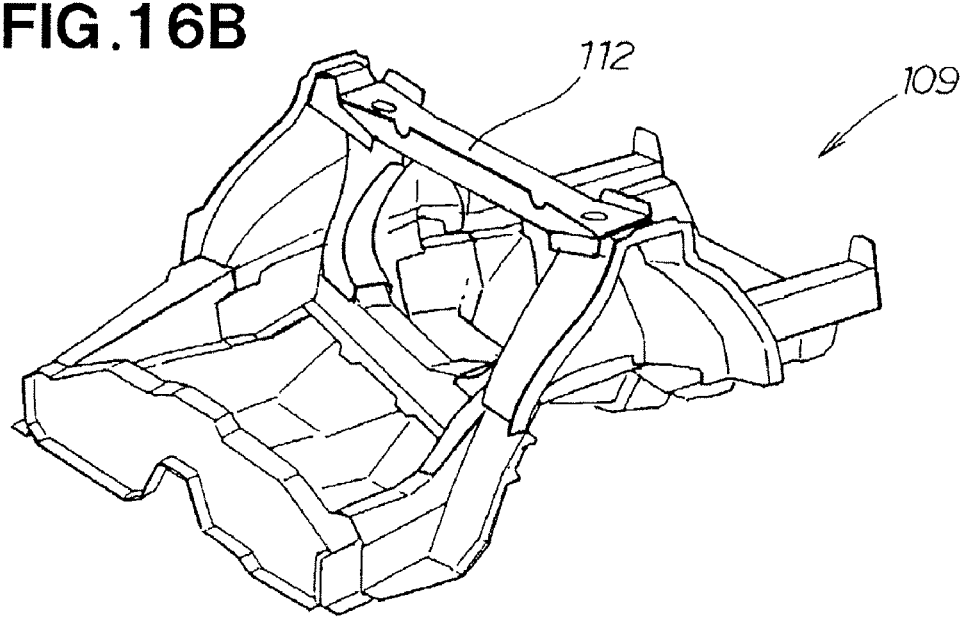

FIGS. 16A and 16B show a step for attaching a crossbeam member 112 between the left and right wheel house members 111L, 111R, and a description is provided with reference to FIG. 10.

The crossbeam member 112 is temporarily welded between the left and right wheel house members 111L, 111R on the seventh welding stage 58, house, according to FIG. 16A.

In the eighth welding stage 59, the crossbeam member 112 is subjected to additional welding, and the assembling of a rear floor part according to the second vehicle type is completed, according to FIG. 16B.

The fully assembled second frame panel assembly 109 passes through the ninth welding stage 60, and last reaches the end stage 68.

The left and right wheel house members 111L, 111R and the cross beam member 112 are supplied to the fifth and sixth welding stages 56, 57 by the second main welding line transfer mechanism 89; however, the structure and function of the second main welding line transfer mechanism 89 are not substantially different from the previously described first main welding line transfer mechanism 74, and a description has accordingly not been provided.

A step for welding a rear floor part of a third vehicle type shall now be described with reference to FIGS. 17 to 21.

FIG. 17 shows the flow of a workpiece according to the manufacture of a third vehicle type in a welding line, and a description is provided with reference to FIG. 1.

A panel member assembly according to the third vehicle type, which is the workpiece, passes through the first welding stage 31 and the second welding stage 33 disposed on the sub-welding line 12, and reaches the first rear receiving stage 73 via the first main welding line transfer mechanism 74.

The frame member is transferred to the fifth welding stage by the fifth transfer robot 62 after being assembled on the third welding stage 51 and the fourth welding stage 55. The panel member assembly according to the third vehicle type is transferred from the first rear receiving stage 73 to the fifth welding stage 56 by the fifth transfer robot 62. The panel member assembly and the frame member assembly are subsequently combined. Specifically, the fifth welding stage 56 is a merging stage 75 for the panel member assembly and the frame member assembly of the third vehicle type.

A vehicle body transferred from the fifth welding stage 56 to the sixth welding stage 57 is subjected to additional welding in the sixth welding stage 57, and other members are attached in the seventh and eighth welding stages 58, 59. Each step is described in order below.

Figure 18:
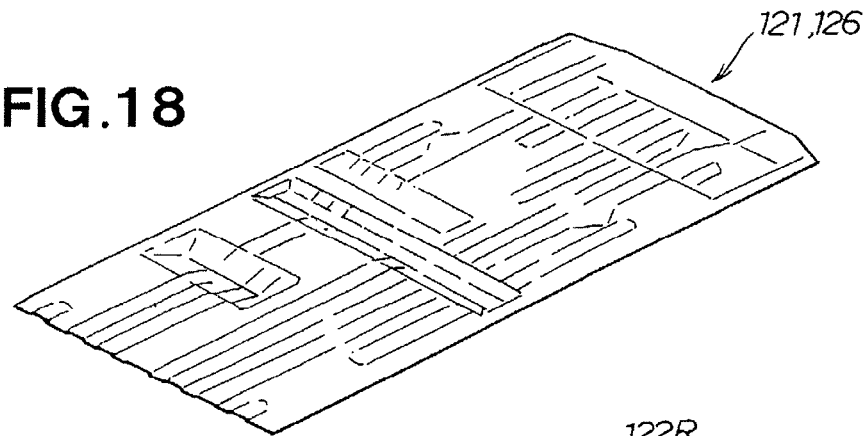
FIG. 18 shows a panel welding step for welding a panel member according to the third vehicle type using a sub-welding line.

FIG. 18 shows a panel welding step for welding panel members of different types according to the third vehicle type using the sub-welding line.

A predetermined jig truck is caused to move to the first welding stage 31 shown in FIG. 17, and a reinforcing member (not shown) is positioned on the third rear floor 121 in the first welding stage 31.

Welding is not performed on the third rear floor 121 on the second welding stage 33. The workpiece obtained from the reinforcing member being welded to the third rear floor 121 is referred to as a third panel member assembly 126.

Figure 19A:
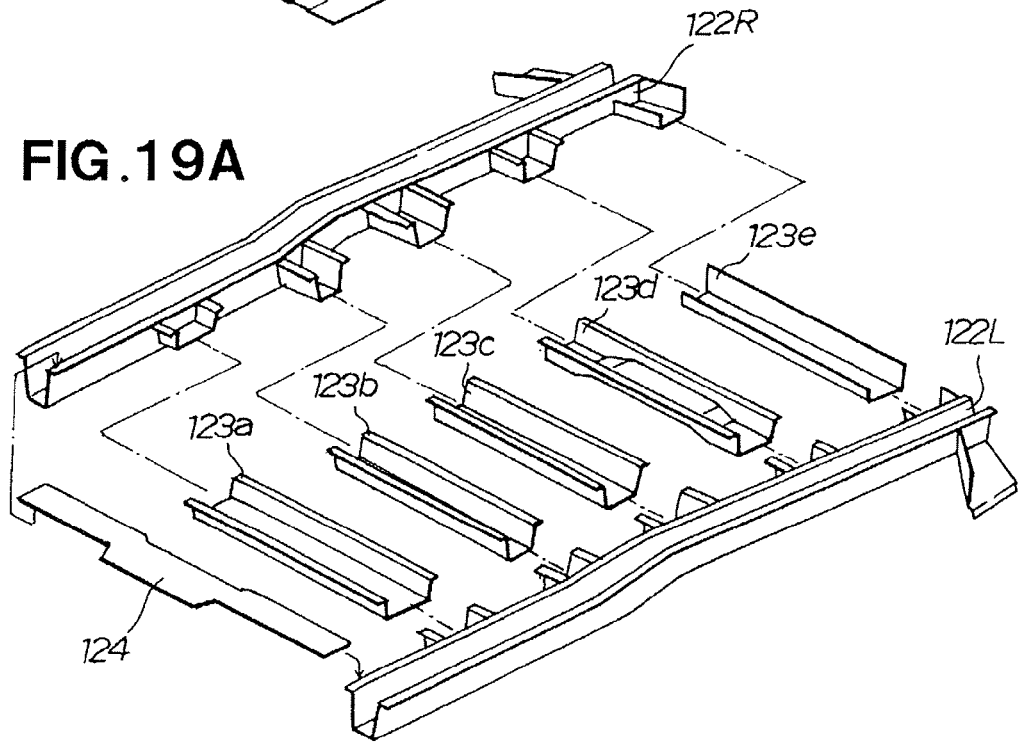
FIGS. 19A and 19B show a frame welding step for welding a plurality of types of frame members according to the third vehicle type using a main welding line.
Figure 19B:
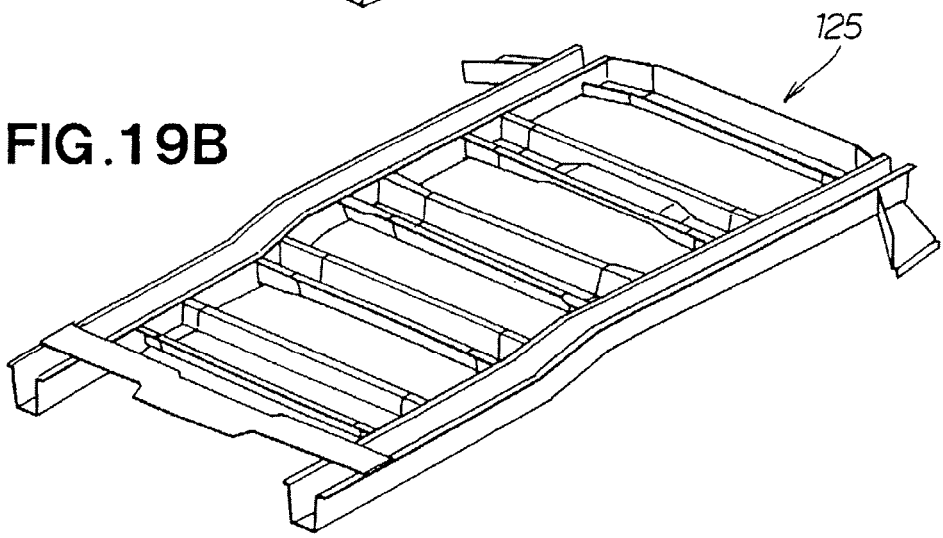

FIGS. 19A and 19B show a frame welding step for welding different types of frame members according to the third vehicle type on the main welding line, and a description is provided with reference to FIG. 17.

In FIG. 19A, a predetermined jig is transferred to the third welding stage 51, and a third left rail 122L and right rail 122R are positioned on the jig. Third rear cross members 123a to 123e of different types and a second sub-cross member 124 are positioned between the first left and right rails 112L, 112R. Each part above is temporarily welded together and integrated.

The member obtained by integrating the left rail 122L, the right rail 122R, the third rear cross members 123a to 123e, and the second sub-cross member 124 is referred to as the third frame member assembly 125.

The third frame member assembly 125 is subjected to additional welding in the fourth welding stage 55, according to FIG. 19B.

Figure 20:
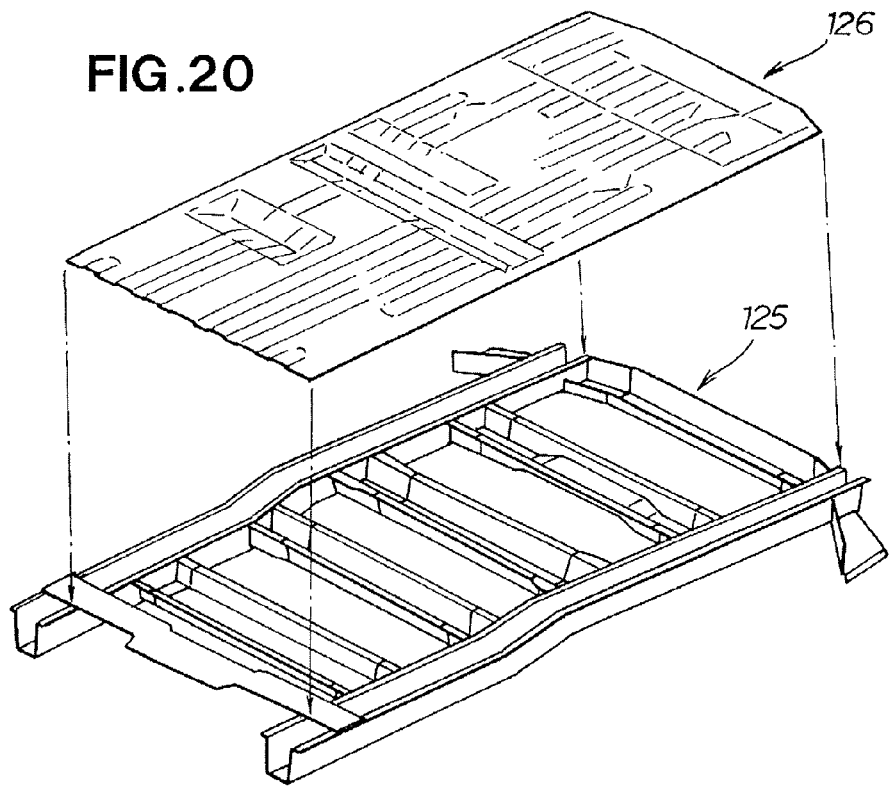
FIG. 20 shows a frame-panel combining step for combining a panel member and a frame member according to the third vehicle type.

FIG. 20 shows a frame-panel combining step for combining a panel member according to the third vehicle type, and a description is provided with reference to FIG. 17.

The main welding line 13 has a frame-panel combining step for combining the third panel member assembly 126, which is the panel member, with the third frame member assembly 125, which is the frame member.

The third frame member assembly 125 is transferred from the third welding stage 51 to the fourth welding stage 55, and the third panel member assembly 126 is transferred from the second welding stage 33 to the fifth welding stage 56 via the first panel supply part 15. The third panel member assembly 126 used as the panel member is integrated with and welded to the third frame member assembly 125 used as the frame member.

The member obtained by integrating the third frame member assembly 125 and the third panel member assembly 126 is referred to below as a third frame panel assembly 127.

Figure 21:
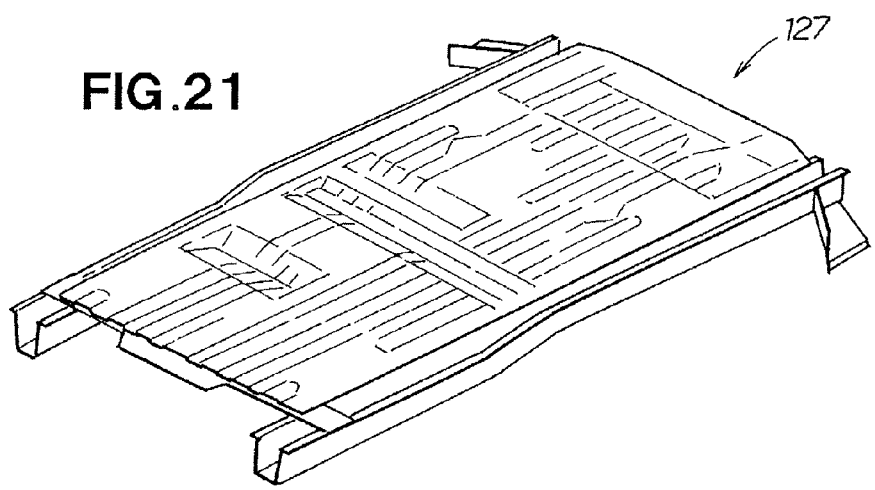
FIG. 21 shows a frame-panel welding step for welding a panel member on a frame member according to the third vehicle type.

The third frame panel assembly 127 described above is welded in an increased number of points in the sixth welding stage 57, as shown in FIG. 21.

Figure 22A:
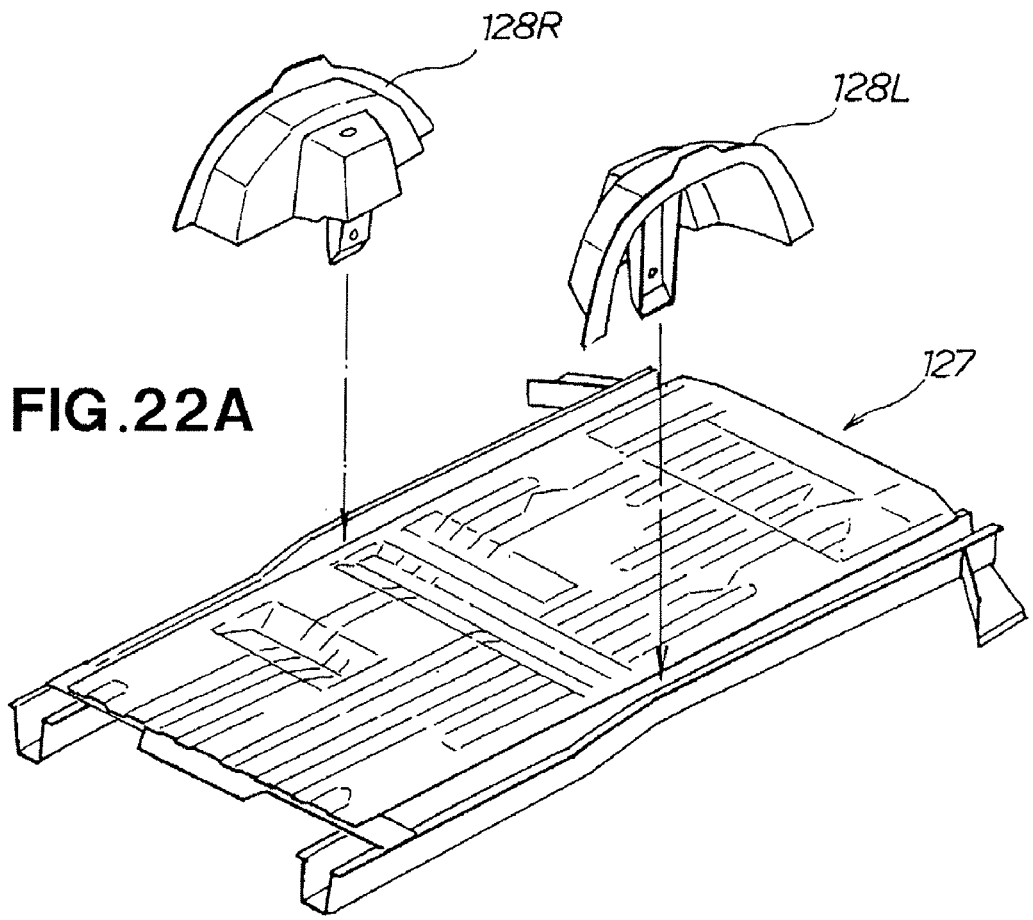
FIGS. 22A and 22B show a step for attaching left and right wheel house members on a third frame panel assembly according to the third vehicle type.
Figure 22B:
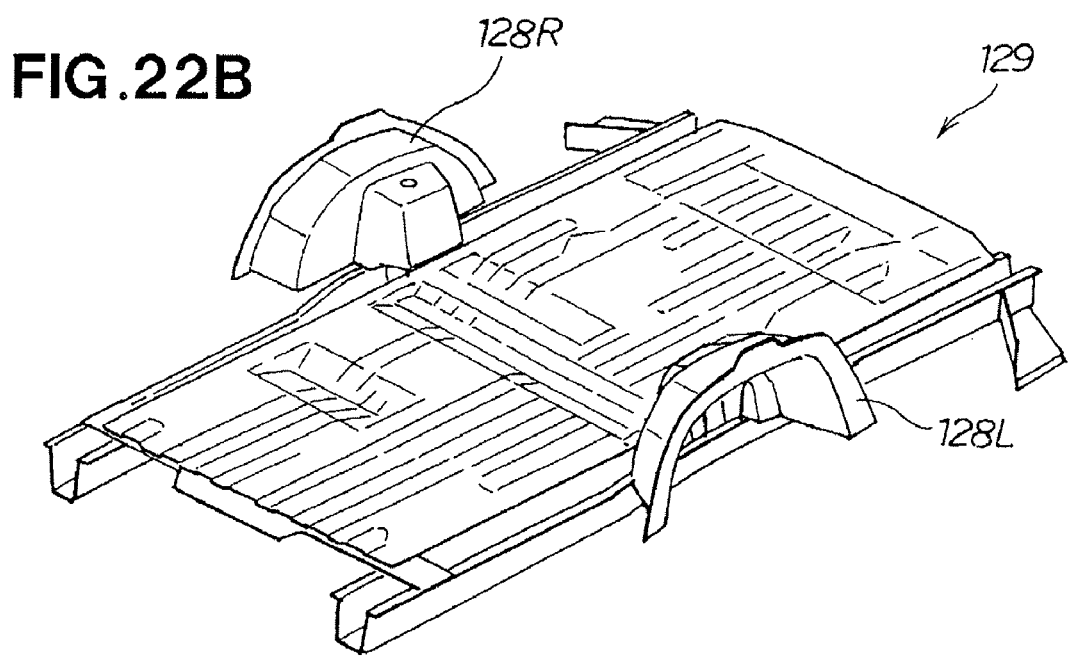

FIGS. 22A and 22B show a step for attaching left and right second wheel house members 128L, 128R to the third frame panel assembly 127 according to the third vehicle type, and a description is provided with reference to FIG. 17.

The left and right second wheel house members 128L, 128R are temporarily welded on the left and right end parts of the third frame panel assembly 127 on the seventh welding stage 58, according to FIG. 22A.

The left and right second wheel house members 128L, 128R, which are temporarily welded in the lateral direction with respect to the third frame panel assembly 127, are welded in an increased number of points on the eighth welding stage 59, according to FIG. 22B. A rear frame assembly 129, which is a rear frame of the third vehicle type, is thereby completed.

The left and right second wheel house members 128L, 128R are supplied to the fifth and sixth welding stage 56, 57 by the second main welding line transfer mechanism 89; however, the structure and function of the second main welding line transfer mechanism 89 are not substantially different from the previously described first main welding line transfer mechanism 74, and a description has accordingly not been provided.

Table 1 shows the members used on each of the welding stages, indicates whether primary welding or secondary welding was performed, shows the merging parts, and provides associated reference drawings, with all information indicated with respect to the first vehicle type, the second vehicle type, and the third vehicle type.

In the table, WH indicates a wheel house member, and CB indicates a crossbeam member.

TABLE 1

| | Welding stage | | | | | | | |
|---|---|---|---|---|---|---|---|---|
| Model | (1) | (2) | (3) | (4) | (5) | (6) | (7) | (8) |
| First vehicle type | Primary panel welding | Secondary panel welding | | | | | | |
| Reference drawing | FIG. 6 | FIG. 6 | | | | | | |
| | | | Primary frame welding | Primary panel + frame welding | Secondary panel + frame welding | | | |
| Reference | | | FIG. 7 | FIG. 8 | FIG. 9 | | | |

TABLE 1-continued

| Model | (1) | (2) | (3) | (4) | (5) | (6) | (7) | (8) |
|---|---|---|---|---|---|---|---|---|
| Second vehicle type | Primary panel welding | Secondary panel welding | | | | | | |
| Reference drawing | FIG. 11 | FIG. 11 | | | | | | |
| | | | Primary frame welding | Primary panel + frame welding | Secondary panel + frame welding | Primary (panel + frame) + WH welding | Primary (panel + frame + WH) + CB welding | Secondary (panel + frame + WH + CB) welding |
| Reference drawing | | | FIG. 12 | FIG. 13 | FIG. 14 | FIG. 15 | FIG. 16 | FIG. 16 |
| Third vehicle type | Primary panel welding | | | | | | | |
| Reference drawing | FIG. 18 | | | | | | | |
| | | | Primary frame welding | Secondary frame welding | Primary panel + frame welding | Secondary panel + frame welding | Primary (panel + frame + WH) + CB welding | Secondary (panel + frame + WH + CB) welding |
| Reference drawing | | | FIG. 19 | FIG. 19 | FIG. 20 | FIG. 21 | FIG. 22 | FIG. 22 |

The action of the welding facility described above and a method for manufacturing a vehicle body using the welding facility is described next.

FIGS. 1, 4, 5, 10, 17 are used as reference in the following description. Panel members of different types are welded on the sub-welding line 12, frame members of different types are welded on the main welding line 13, and the panel members are thereafter integrated with and welded to the frame members on the main welding line 13, whereby a vehicle body is manufactured.

The transfer mechanism 70 for transferring the panel members to a desired welding stage is provided at the end of the sub-welding line 12, and the merging part 75 can be changed to conform to the number of steps in the welding operation.

When a plurality of types of products is present in a variety of combinations and manufactured using a single main welding line, the number of steps in the welding tasks differs according to the type of product; therefore, the merging parts 75 are usually different.

According to the present invention, the transfer mechanism 70 that allows the merging part 75 to be changed is provided to address this issue; therefore, individual transfer mechanisms 70 do not have to be provided for each product. Specifically, the transfer mechanism 70 can be shared. The ability for the transfer mechanism 70 to be shared makes it possible to reduce the surface area required for the facility, and reduce the facility costs.

Furthermore, a frame welding step for welding a frame member, a panel welding step for welding panel members, and a frame-panel welding step for welding a panel member to a frame member are provided in the welding line of the present invention.

The frame members and the panel members are welded using separate lines, thereafter integrated, and a vehicle body is manufactured. According to this method, for example, the primary welding and the secondary welding can be performed on adjacent stages in the same step because a plurality of stages is provided in the same step.

If the primary welding and secondary welding can be performed on the adjacent stages, then even if vehicle bodies having completely different structures are used, it is possible for the vehicle bodies to be manufactured together on a single main welding line; i.e., it is possible for mixed model manufacturing to be carried out. Since mixed model manufacturing can be performed on a plurality of vehicle types using a single welding line, the surface area of the facility can be reduced, and the costs of the facility can be considerably reduced.

Furthermore, the fact that the primary welding and the secondary welding can be performed together in each of the welding lines makes it possible for a flexible approach to be adopted by allocating members having different numbers of welding points to different welding stages, even when the vehicle body structures are different and the number of welding points is different.

For example, if the primary welding and the secondary welding are allocated to different welding stages in the panel welding line, and allocated to different welding stages when the frame and panel are integrated, no concerns will be presented that the manufacturing capability of the sub-welding line will be compromised when the type of vehicle body is changed.

Obviously, various minor changes and modifications of the present invention are possible in light of the above teaching. It is therefore to be understood that within the scope of the appended claims the invention may be practiced otherwise than as specifically described.

What is claimed is:
1. A welding facility comprising:
   a main welding line for manufacturing an assembly of frame members; and
   a sub-welding line for manufacturing an assembly of panel members, the sub-welding line merging with the main welding line at a merging point,
   wherein:
   the main welding line is comprised of a plurality of welding stages, each of said welding stages respectively provided with a welding robot, the sub-welding line is provided at an end portion thereof with a transfer mechanism for transferring the panel member assembly to a desired welding stage, the transfer mechanism selectively operable to accommodate any of a plurality of different assembly operations, and the welding facility is configured and arranged to allow a location of the merging point between the sub-welding line and the main welding line to be adjustably changeable according to the type of product to be welded.

2. The welding facility of claim 1, wherein the transfer mechanism comprises a rail established parallel to the main welding line; a truck that moves along the rail; and a transport robot provided on the truck.

3. The welding facility of claim 1, wherein the welding facility is provided with at least two or more sub-welding lines that merge with the main welding line, and that are provided with a transfer mechanism used for transferring a workpiece to a desired stage.

4. The welding facility of claim 1, wherein a plurality of parts storage areas are provided for the sub-welding line, and
wherein the sub-welding line is selectively operable to supply parts selected from said plurality of parts storage areas to any one of a plurality of stages of the main assembly line, whereby a number of required welding steps in an assembly operation can be adjusted by changing a merging point of the sub-welding line with the main welding line.

5. The welding facility of claim 1, further comprising a jig storage area having a plurality of jig storage trucks therein, and a jig transport conveyor extending between the jig storage area and a welding stage of said sub-welding line, wherein operation of the jig transport conveyor is coordinated with operation of the transfer mechanism.

6. A welding facility comprising:
a main welding line for manufacturing an assembly of frame members; and
a plurality of sub-welding lines for manufacturing associated subassemblies, each of the sub-welding lines merging with the main welding line at an associated merging point,
wherein:
the main welding line is comprised of a plurality of welding stages, each of said welding stages respectively provided with a welding robot,
each of the respective sub-welding lines is provided at an end portion thereof with a transfer mechanism for transferring its respective subassembly to a desired welding stage, the transfer mechanism selectively operable to accommodate any one of a plurality of different assembly operations, and
the welding facility is configured and arranged to allow a location of the respective merging points between the sub-welding lines and the main welding line to be adjustably changeable according to the type of product to be welded.

7. The welding facility of claim 6, wherein a plurality of corresponding parts storage areas are provided for each of said sub-welding lines, and
wherein each sub-welding line is selectively operable to supply parts selected from said plurality of corresponding parts storage areas to any one of a plurality of stages of the main assembly line, whereby a number of required welding steps in an assembly operation can be adjusted by changing a merging point of the sub-welding line with the main welding line.

8. The welding facility of claim 6, further comprising a jig storage area having a plurality of jig storage trucks therein, and a jig transport conveyor extending between the jig storage area and a welding stage of one of said sub-welding lines, wherein operation of the jig transport conveyor is coordinated with operation of an associated transfer mechanism.

* * * * *